United States Patent

Irie et al.

[11] Patent Number: 6,038,644
[45] Date of Patent: Mar. 14, 2000

[54] MULTIPROCESSOR SYSTEM WITH PARTIAL BROADCAST CAPABILITY OF A CACHE COHERENT PROCESSING REQUEST

[75] Inventors: Naohiko Irie, Kawasaki; Naoki Hamanaka, Tokyo; Masabumi Shibata, Kawasaki, all of Japan

[73] Assignee: Hitachi, Ltd., Tokyo, Japan

[21] Appl. No.: 08/820,831

[22] Filed: Mar. 19, 1997

[30] Foreign Application Priority Data

Mar. 19, 1996 [JP] Japan ................................ 8-062452

[51] Int. Cl.[7] .................................................. G06F 12/12
[52] U.S. Cl. ......................... 711/141; 711/144; 711/148; 711/146
[58] Field of Search .................................. 711/144, 146, 711/141, 148; 395/311, 553, 800.16; 710/33; 709/204, 217, 248

[56] References Cited

U.S. PATENT DOCUMENTS

| | | |
|---|---|---|
| 5,386,511 | 1/1995 | Murata et al. . |
| 5,559,987 | 9/1996 | Foley et al. .............................. 711/144 |
| 5,581,777 | 12/1996 | Kim et al. ................................ 712/16 |
| 5,598,550 | 1/1997 | Shen et al. .............................. 711/146 |
| 5,742,766 | 4/1998 | Takeuchi et al. ........................ 395/553 |
| 5,826,049 | 10/1998 | Ogata et al. ............................. 710/131 |
| 5,829,040 | 10/1998 | Son ......................................... 711/146 |

FOREIGN PATENT DOCUMENTS 4-328653  11/1992  Japan .
8-263374  10/1996  Japan .

OTHER PUBLICATIONS

D. Anderson & T. Shanley, "Pentium Processor System Architecture, Second Edition", Chapter 4, "Multiple Processors and the MESI Model", *Mindshare, Inc.* 1995, pp. 61–91.

B. Catanzaro, "Multiprocessor System Architectures", *Sun Microsystems*, 1994, pp. 157–170.

L. Censier & P. Feautrier, "A New Solution to Coherence Problems in Multicache Systems", *IEEE Transactions on Computers*, Dec. 1978, vol. C–27, No. 12, pp. 1112–1118.

*Primary Examiner*—B. James Peikari
*Attorney, Agent, or Firm*—Antonelli, Terry, Stout & Kraus, LLP

[57] ABSTRACT

Information indicative of whether each processor unit caches data which belongs to each of the plural areas of the main memory larger than a cache line is stored in the multicast table. The destinations of a coherent processing request which should be sent to other processor units are limited by the information stored in this table. The interconnection network broadcasts the request to the limited destinations. When the processor unit of the destination of this processing request sends back a cache status of the data designated by the request, it also sends back the caching status in the processor unit concerning a specific memory area which includes the data. Depending on this send back, the request source processor unit renews a portion relating to the destination processor unit within the caching status concerning that specific memory area stored in the processor unit.

26 Claims, 12 Drawing Sheets

MULTIPROCESSOR SYSTEM WITH PARTIAL BROADCAST CAPABILITY OF A CACHE COHERENT PROCESSING REQUEST

BACKGROUND OF THE INVENTION

The present invention relates to a tightly-coupled multiprocessor system which comprises plural processor units sharing a main memory and connected by an interconnection network.

In many prior art tightly-coupled multiprocessor systems, a shared bus or a network (parallel transfer network) which can transfer plural messages in parallel is used for an interconnection network which connects the processor units and a main memory shared by them. In the latter method, the cache directory method is known as one of the methods to maintain cache coherency between the processor units. For instance, see L. Censier and P. Feautrier, "A New Solution to Coherence Problems in Multicache Systems," IEEE Transactions on Computers, Vol.C-27, No. 12, pp. 1112 to 1118 (1978) (hereinafter referred to as the reference document 1).

In this method, a directory is used which collectively holds, in correspondence to all areas of a cache line size in the main memory area, cache statuses of data of respective areas in all processor units. The cache line transfer requests/invalidate requests, etc., are sent through a parallel transfer network only to specific processor units designated by the directory. Therefore, there is an advantage that an unnecessary coherent read request is not sent to the caches of the other processor units.

In this method, however, cache miss latency becomes long, because data transfer is executed three times to one coherent read request. Concretely, a memory read request is sent from a processor unit requesting data to the main memory through the parallel transfer network. The main memory inspects the directory. When another processor unit has updated the data, the main memory issues a line transfer request to the cache in that another processor unit. That another processor unit transfers the data to the request source processor unit according to the line transfer request.

Another cache coherency maintenance method is a snoop cache method. Refer, for instance, to Ben Catanzaro, "Multiprocessor System Architectures," Sun Microsystems, pp.157 to 170, 1994 (hereinafter referred to as the reference document 2) or Don Anderson/Tom Shanley, "PENTIUM PROCESSOR SYSTEM ARCHITECTURE Second Edition," MINDSHARE, Inc., pp. 61 to 91, 1995 (hereinafter referred to as the reference document 3). In this method, each processor unit controls the cache status of the data held in the cache of its own. Maintenance of coherency is achieved by communication between the request source processor unit of data and all other processor units.

There are various methods in the snoop method but the typical one is as follows. That is, a processor unit which requests data sends shared bus a coherent read request. Each processor unit receives this coherent read request on the shared bus, checks the cache status of data designated by this request, and notifies the request source processor unit of the status. The main memory transfers the data designated by the request to the request source processor unit. However, when either one of the processor units has updated the data which the request designates, that processor unit transfers the data to the request source processor unit in place of the main memory.

Therefore, the snoop method is superior to the directory method in that read processing completes by transfer of two times in any case, that is, transfer of a coherent read request from a request source processor unit and transfer of the requested data from either the main memory or a processor or unit. In the snoop method, however, coherent read requests are sent from all the processor units to the shared bus. Therefore, the busy rate of the shared bus increases when the number of processor units increases. Here, the busy rate is defined as a ratio of the number of requests effectively acceptable per unit time to the maximum number of requests acceptable per unit time. As a result, the wait time for arbitration of the shared bus increases. Therefore, the problem occurs that the time until necessary data arrives at a processor unit, that is, cache miss latency increases. Moreover, it is necessary in this method for even a cache without the shared data to respond to the coherent read request on the shared bus and to search for the cache tag. Therefore, the busy rate of the cache tag increases, too and the cache miss latency increases in addition.

In Japanese Laid Open Patent Application No. HEI 04-328653 or its corresponding U.S. Pat. No. 5,386,511 (hereinafter referred to as the reference document 4), a method is disclosed in which only the coherent read request is transferred by using the shared bus and other information such as the memory data is transferred by using an interconnection network which can transfer messages in parallel.

SUMMARY OF THE INVENTION

The traffic on the shared bus decreases in the prior art described in the reference document 4 compared with the other prior art described in the reference document 2 or 3. However, all the processors send the shared bus coherent read requests. Therefore, the problem still remains in this prior art that the busy rate of the shared bus is large and the cache miss latency is large.

Therefore, each prior art has the problem of increase of the cache miss latency due to large traffic on the shared bus. This problem becomes more remarkable when more processors are used.

The object of the present invention is to provide a multiprocessor system which can reduce the traffic for maintenance of cache coherency on the interconnection network.

To achieve that object, in a preferable mode of a multiprocessor according to the present invention, a caching status memory is provided in correspondence to each of plural processor units. The caching status memory stores a processor unit caching status for discriminating whether each processor unit and each of the other processor units hold data which belongs to each of plural memory areas which belong to the memory unit which composes the main memory shared by those processor units.

In correspondence to each processor unit, a logic is provided which responds to a memory access request from that processor unit and generates the first cache coherent processing request related to data of the first memory address designated by the memory access request, and a logic is provided which generates information which designates destination processor unit of the cache coherent processing request. This destination information generate logic generates destination information designating part of the processor units which hold at least one data which belongs to the first memory area to which that first memory address belongs, based on the stored processor unit caching status. The interconnection network is composed by a network which responds to that destination information, and transfers the first cache coherent processing request to the part of the processor units in parallel.

More concretely, in correspondence to each processor unit, a logic is provided which renews a portion concerning that processor unit, among that processor unit caching status stored in correspondence to the processor unit, in accordance to change in the memory areas to one of which data maintained in the cache memory of the processor unit belongs.

In addition, in correspondence to each processor unit, a logic is provided which receives notification of the processor unit caching statuses from other processor units when that processor unit receives respective cache status notification from those other processor units after the processor unit sends the coherent processing request to those other processor units. The logic renews the processor unit caching status stored in that processor unit, based on the received processor unit caching statuses concerning those other processor units.

DESCRIPTION OF EMBODIMENTS

Figure 1:
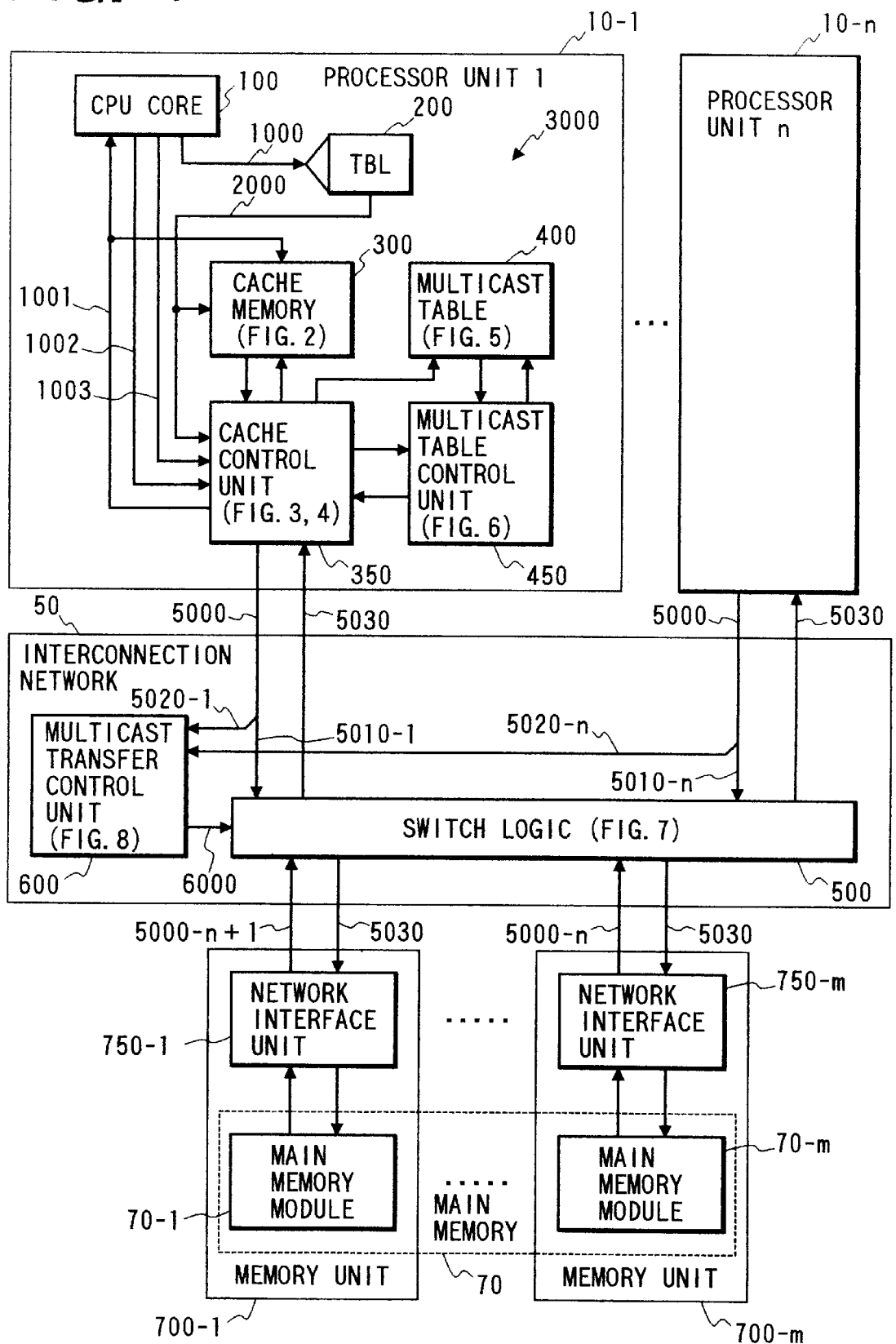
FIG. 1 is a schematic block diagram of a multiprocessor system according to the present invention.

Hereafter, the multiprocessor system according to the present invention will be explained in more details by referring to several embodiments shown in the drawings. The same or like numerals represent the same or like elements. With the second embodiment or later, only differences between it and the first embodiment will be explained.

Embodiment 1
(1) Structure of the Apparatus

FIG. 1 shows an overall structure of a multiprocessor system according to the present invention, and it comprises plural processor units 10-1 to 10-n (n is an integer larger than two), plural memories unit 700-1 to 700-m (m is an integer larger than two), units (not shown) which contain peripheral devices such as input-output devices and so on, and an interconnection network 50 which connects those units.

The memory unit comprises a main memory module 70-1, , , or 70-m which constitutes a different portion of the main memory 70 which holds a program and data. Each main memory module 70-1, , , or 70-m is connected to an interconnection network 50 byway of a corresponding network interface unit 750-1, , , or 750-m.

Each of the processor units 10-1 to 10-n comprises a CPU core 100 which sequentially reads out program instructions from the main memory 70 and sequentially executes them, a translation look aside buffer (TLB) 200 which address-translates a virtual translates at execution of an instruction accessing the main memory 70, into a real address, a cache memory 300 which stores copies of portions of the main memory 70, and a cache control circuit 30 which controls the cache memory 300. The cache control circuit 30 has a cache control unit 350, a multicast table 400 characteristic to the present embodiment, and a multicast table control unit 450 which controls this table.

The present embodiment adopts the snoop method as the method of maintaining cache coherency, but uses a parallel data transfer network, more concretely, a crossbar switch, as the interconnection network 50. The interconnection network 50 is used for transfer of not only memory data but also coherent read requests, and can transfer these different pieces of information in parallel. In addition, the interconnection network 50 can execute a one-to-one communication mode which transfers a message inputted to one input port to a specific output port which the message designates, and a partial broadcast mode or a multicast mode which transfers the message to plural output ports which the message designates among all the output ports.

When a coherent request concerning data is transferred from a processor unit to other processor units according to the snoop method in the present embodiment, the request is not transferred to all other processor units, but is multicast only to part of the processor units which are likely to have a copy of the data and to one of the memory units. The multicast table 400 is a memory which stores information identifying processor units which are likely to have cached the data of the address which the coherent request designates. The multicast table control unit 450 uses the information and generates information designating part of the processor units to which said coherent request is to be transferred. Only the part of the processor units transfer the cache status of the data in respective processor units, to that request source processor unit, as a response to the coherent request.

Therefore, the total number of coherent requests transferred onto the interconnection network 50 decreases than when each coherent request is transferred to all other processor units. In addition, the responses to this coherent request decrease, too. Therefore, the traffic on the interconnection network 50 decreases. In addition, because the responses to the request source processor unit decrease the processing in the request source processor unit decreases, too. In addition, because processor units to which the coherent request has not been transferred are not requested to process the originally useless coherent request, the necessity for executing processing useless to those processor units decreases.

(2) Outline of Operation

In the following, the schematic of the system operation by memory read/store requests from CPU core 100 will be briefly explained separately for cases of (a) cache hit and (b) cache miss. In the present embodiment, the cache status has either of four statuses of modified (M), exclusive (E), shared (S), and invalid (I). Concerning concrete transition of such cache statuses, refer to the reference document 3, for instance. The following points, however, are different in the present embodiment from those described in the reference document. When a cache of its own hits to a read request from another processor unit in case the cache is in the M status, the next status of the cache is not set to S but to I, and no write back is executed to the main memory 70.

(a) Cache hit (a1) Memory load instruction

When the cache control unit 350 judges a cache hit based on the condition which will be explained later, to a memory load instruction issued by CPU core 100 in the processor unit 10-i (i is either one of the integers 1 to n, with the same being true below), the cache control unit 350 reads the data designated by this instruction from the cache memory 300 and sends it to CPU core 100 by way of line 1001. The cache status of this data does not change, in this case.

(a2) Memory store instruction

When the cache control unit 350 judges a cache hit to the memory store instruction which CPU core 100 in the processor unit 10-i issued, the cache control unit 350 rewrites the original data in the cache memory 300 by the store data sent from CPU core 100 by way of line 1001. However, this rewrite is executed when the cache status of the data which the instruction designates is M or E status. In addition, when the original cache status ST of this data is E, the cache control unit 350 rewrites the original cache status E to the status M.

(b) Cache miss

When the cache control unit 350 judges a cache miss to the memory load instruction issued by CPU core 100 in the processor unit 10-i, the multicast table control unit 450 generates destination information designating destination units to which the coherent read request is to be sent, by using the multicast table 400. The destination units designated by this destination information are part of the processor units 10-1 to 10-n which are likely to have caches data belonging to a memory area to which an address designated by this memory load instruction belongs and one of the memory units 700-1 to 700-m which contains the main memory module 70-k (k is one of 1 to m) to which the memory address designated by this instruction is allocated by the interleave method.

The cache control unit 350 sends the interconnection network 50 a partial broadcast message which contains the coherent read request and the destination information. The interconnection network 50 transfers this message to these destination units in parallel. In the processor unit 10-j (j is one of 1 to n) which has received the coherent read request, the cache control unit 350 reads the cache status of the data designated by this request from the cache memory 300, and transfers, as a response, a coherency response message which contains this cache status, to the source processor unit 10-i by way of the interconnection network 50. When the cache status of the data designated by this request is the M status, the cache control unit 350 reads this requested data from the cache memory 300 and sends the source processor unit 10-i a message which contains this data, byway of the interconnection network 50.

Moreover, the processor unit 10-j changes the cache status according to the kind of the coherent read request under control of the cache control unit 350. A detailed operation of the change of the cache status will be described later. Moreover, the request source processor unit 10-i stores the data corresponding to the coherent read request, transferred from the memory unit 700-k, into the data portion 330 of the cache memory 300. However, when the data corresponding to the coherent read request is sent from a processor unit 10-j, the request source processor unit 10-i stores this data in the cache memory 300, and does not write the data transferred from the above-mentioned memory unit 700-k in the cache memory 300.

When the cache status of the data of the address designated by the memory store instruction issued by CPU core 100 in the processor unit 10-i is other than M or E status, processing is executed which is almost similar to the processing at read miss. Moreover, the data written in the cache memory 300 by the memory store instruction is reflected into the main memory 70 by write back at the time of replacement of the cache line or by compulsory flush of the cache line. The explanation is omitted concerning the data transfer at the write back and at the flush, because it does not differ from the prior art.

(3) Details of the Operations

In the following, details of the above-mentioned operation at cache miss will be explained, with focusing the explanation on the operation of the multicast table 400 and the multicast table control unit 450.

(3A) Hit check of the cache memory 300

The processing which generates the coherent read request by cache miss will be explained first. On a certain processor unit 10-i, CPU core 100, which has executed a memory access instruction, transfers the virtual address VA designated by this instruction to TLB 200 by way of line 1000. TLB 200 translates the virtual address VA to the real address RA, and sends the obtained real address to the cache control unit 350 through line 2000.

Figure 2:
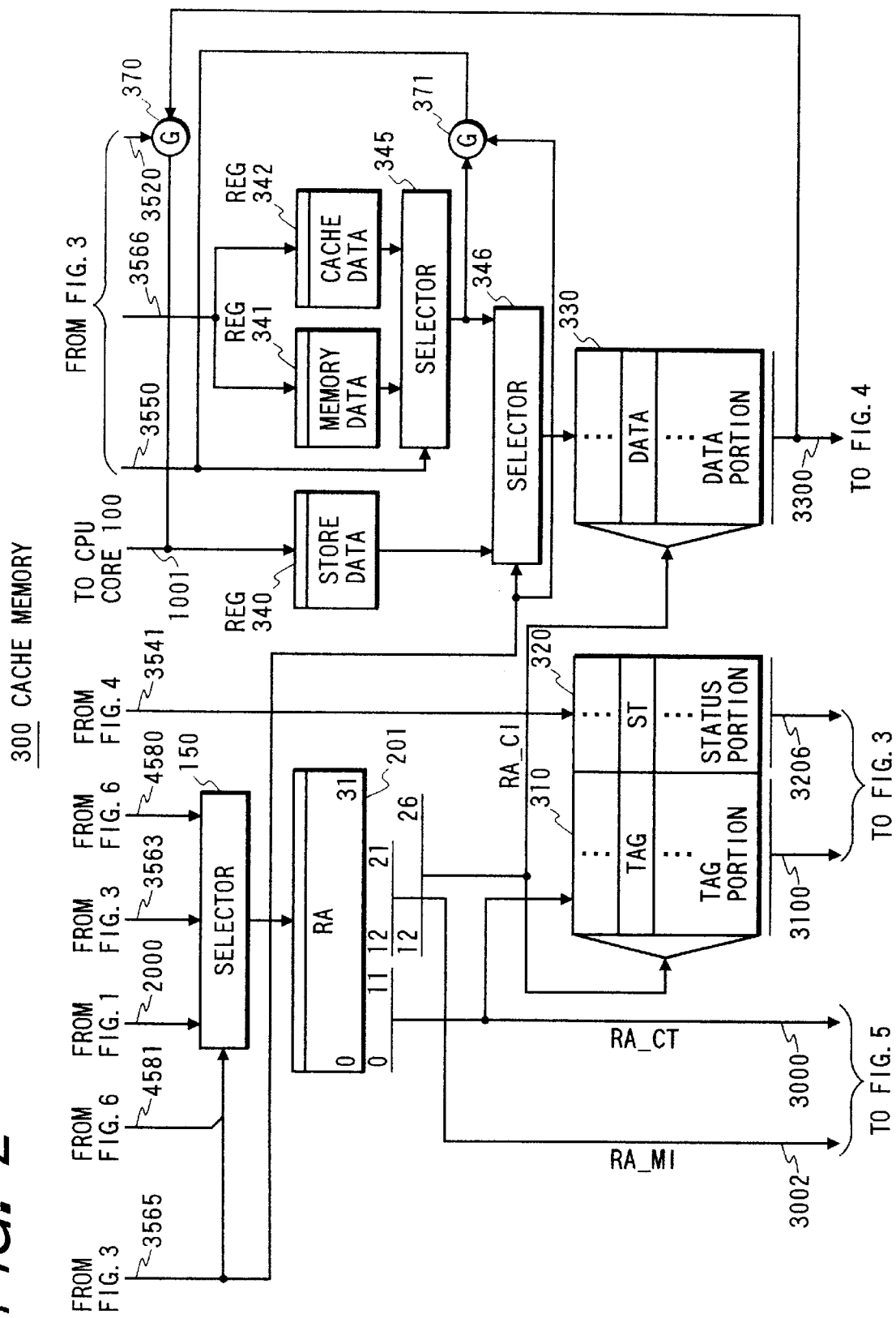
FIG. 2 is a schematic block diagram of a cache memory used in the apparatus of FIG. 1.

In FIG. 2, the cache control unit 350 comprises the data portion 330 which holds data of plural cache lines, the tag portion 310 which holds a tag to the address of each cache line, and the status portion 320 which holds a cache status ST of each cache line. The cache memory 300 is a store-in cache. In addition, the cache memory 300 is a real address cache which holds a real address in the cache tag portion 310. However, the cache memory 300 may be a virtual address cache, if the virtual address can be used in cache coherency control. Moreover, the constructing method of the cache memory 300 uses the direct map method, but other general constructing methods, that is, the set associative method or the full associative methods can be used.

It is presumed that the capacity of the cache memory 300 is 1 MB, for instance, the cache line size is 32 B and the real address RA is 32 bits. In this case, the upper 0th to 11th bits of the real address is stored in the cache tag. The 12th to 26th bits of the real memory address RA are used for the index portion RA_CI to be used to access the cache memory 300. The selector 150 receives through line 2000, the real address RA obtained by the address translation in TLB 200.

The selector 150 selects the real address on line 2000, and sets it in the register 201, when any of the signal 3565 supplied by the receive control logic 356 (FIG. 3) and indicative of whether data has been received from other units and the signal 4581 supplied by the line invalidate control logic 458 (FIG. 6) is not asserted. The index portion of the selected address RA, that is, the upper 12th to 26th bits of thereof is used to access the cache tag portion 310 and the status portion 320, and the tag and the cache status ST of the cache line corresponding to the real address RA are sent to the cache control unit 350 byway of lines 3100 and 3206. Similarly, the data portion 330 is accessed by using the index portion RA_CI of the real address RA, and the corresponding cache data is sent to the cache control unit 350 by way of line 3300.

Figure 3:
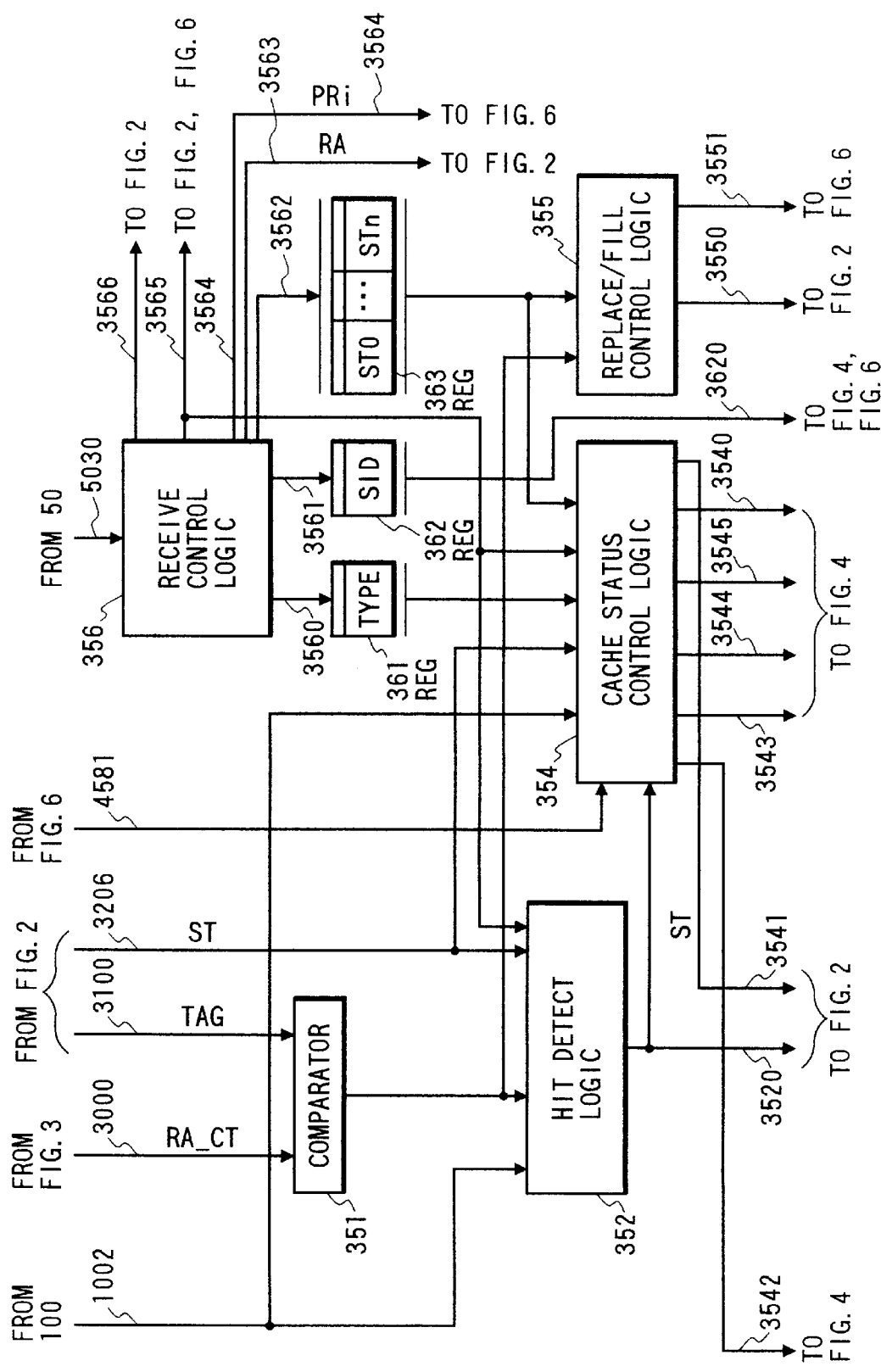
FIG. 3 is a schematic block diagram of a portion of a cache control unit used in the apparatus of FIG. 1.

In FIG. 3, the comparator 351 in the cache control unit 350 compares the read out tag and the tag portion RA_CT of the real address RA, and sends the result to the hit detect logic 352 by way of line 3510. The kind of the memory access instruction is transferred from CPU core 100 to the hit detect logic 352 by way of line 1002, in addition to the comparison result, and the cache status ST previously read out is further transferred by way of line 3206. The signal 3565 indicative of whether data has been received from other units is further supplied from the receive control logic 356.

The hit detect logic 352 judges hit/miss of the cache, based on the three pieces of information described first. This logic judges as follows, when the signal 3565 from the receive control logic 356 is not asserted. It judges cache hit when the comparison result by the comparator 351 shows agreement and the cache status ST is not I, in case the kind of the memory access instruction is load. It judges cache hit when the comparison result by the comparator 351 shows agreement and the cache status ST is E or M, in case the kind of the memory access instruction is store. When the hit detect logic 352 judges cache hit, it turns on the gate 372 (FIG. 2) by line 3520. Thus, the data read out previously onto line 3300 from the cache memory 300 is sent to CPU core 100 by way of line 1001.

Moreover, to the cache status control logic 354, the kind of the memory access instruction is transferred from CPU core 100 by way of line 1002, the cache status ST previously read out is transferred by way of line 3206, and the hit check result is transferred through line 3520. In addition, the signal 3565 indicative of whether data has been received from other units is supplied from the receive control logic 356. The cache status control logic 354 has a logic (not shown) which decides the next status of the cache, based on three pieces of information described first, and this logic operates as follows, when the signal 3565 from the receive control logic 356 is not asserted. It generates the next status M, in case of cache hit, when the kind of the memory access instruction is store, and the cache status ST transferred by way of line 3206 is E status, and stores it in the status portion 320 of the cache memory 300 by way of line 3541. The operations of these hit detect logic 352 and cache status control logic 354 depend on the snoop method, and are basically the same as those already known. So, details of these logics are omitted for the sake of simplicity.

(3B) Generation of a coherent processing request

Figure 4:
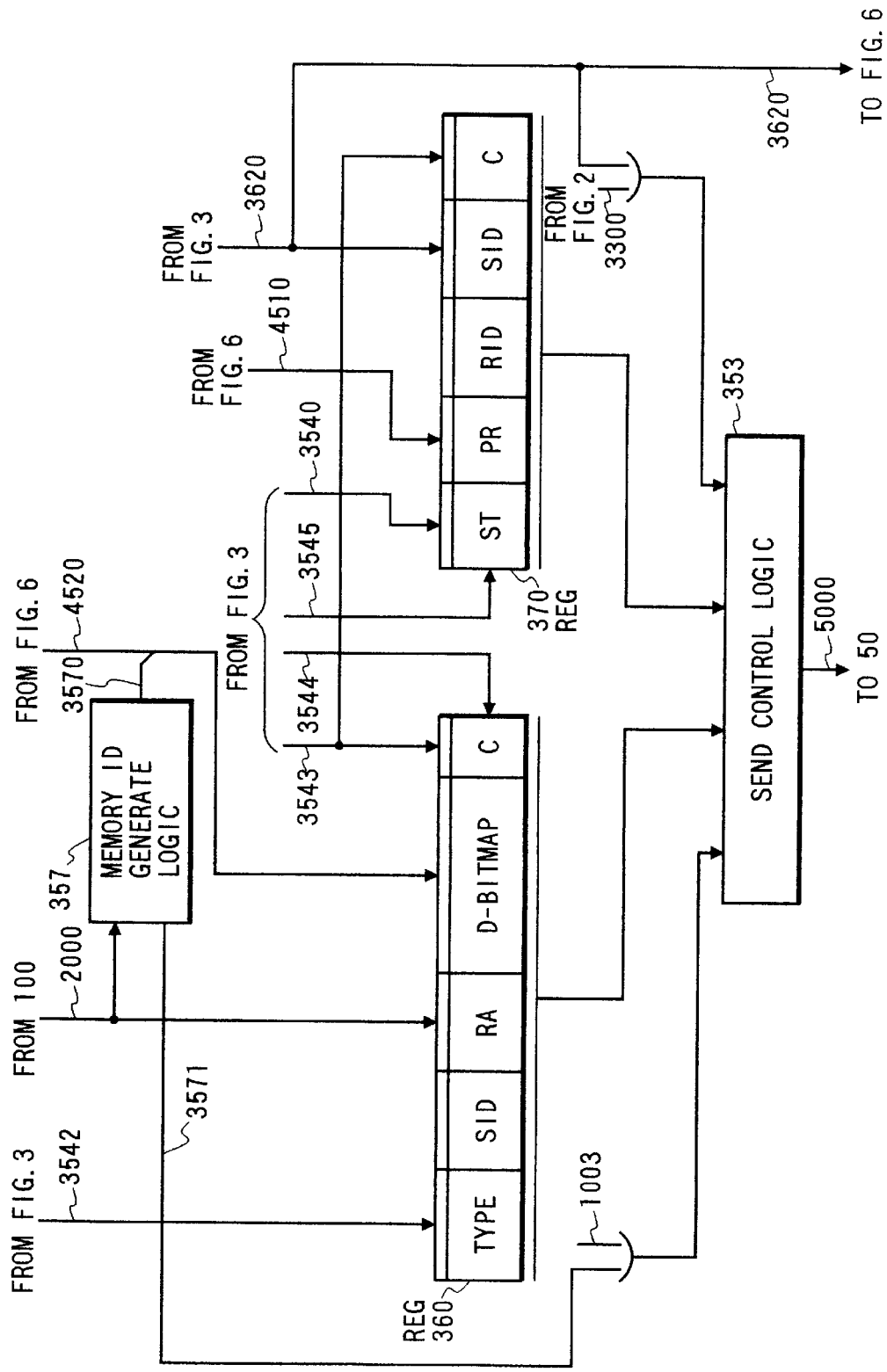
FIG. 4 is a schematic block diagram of the other portion of the cache control unit used in the apparatus of FIG. 1.

When the miss of the cache memory 300 is detected by the hit detect logic 352 in the cache control unit 350 (FIG. 3), the judge result of the hit check is notified to the cache status control logic 354 through line 3520. The cache status control logic 354 responds to this notification, and generates a coherent processing request in the register 360 (FIG. 4). When that memory access instruction is memory read, a coherent read request is generated, to read the data requested by this instruction from the memory unit or other processor unit. The coherent processing request requests the other processor units to execute processing for maintenance of coherency concerning the data of the address designated by the previously executed memory access instruction. The content which this coherent processing request requests is predetermined according to the coherency protocol. Basically the same coherency protocol as the known one is adopted in the present embodiment. It is also possible to adopt the other coherency protocols.

In the coherency protocol based on the snoop method, many coherent processing requests request other processor units to report the cache statuses concerning the data of the memory addresses designated by respective requests. For instance, that coherent read request requests that report of the cache statuses, and requests other processor unit which caches this data with the status M to transfer the data to the request source processor unit. The coherent read request is also sent to one main memory module 70-k where the address is allocated, and requests the module to transfer the data of this address to the request source processor unit.

The data is read from this memory unit, and is used by the request source processor unit, when there is no processor unit which holds the data requested by that memory access instruction in the status M. When there is other processor unit which holds the data requested by that memory access instruction in the status M, the data is transferred from that processor unit to the request source processor unit. There are also coherent processing requests which request a cache status report other than that coherent read request, but in the following, explanation of those coherent processing requests are omitted for the sake of simplicity.

When a coherent processing request is transferred to other plural processor units, the present embodiment controls its destination so that it does not transfer the request to all other processor units but only to part of the processor units which are likely to have cached the data designated by the request.

The format of a coherent processing request comprises the request kind TYPE, the identifier SID of the request source processor unit, and the real address RA of data which should receive coherent processing. The request kind TYPE is decided depending on the kind of the previously executed memory access instruction. In case the instruction is a load instruction as assumed now, the request type of this request becomes coherent read when mishit is judged. In case this memory access instruction is a store instruction, the request type of this request becomes coherent read-invalidate, when mishit is judged.

The cache status control logic 354 has a request information generate logic (not shown). When cache miss is notified by the hit detect logic 352 through line 3520, this request information generate logic generates this request kind TYPE, based on the kind of the memory access instruction transferred from CPU core 100 by way of line 1002 and supplies the generated request kind TYPE to the register 360 through line 3542.

The identifier SID of the request source processor unit is a port number of the request source processor unit in the interconnection network 50. The identifier is decided by the position where the processor unit 10-i is implemented. The input line therefore is omitted in the drawing. The real address RA is supplied by TLB 200 through line 2000. This request information generate logic generates the set signal 3543, when it has generated the request kind TYPE.

The register 260 responds to this set signal 3543, and takes in the above-mentioned three signals and two pieces of transfer control information, that is, the transfer type and the destination information which will be described below. The transfer type C is information designating whether a request which should be transferred to other processor unit is to be transferred to a specific processor unit in the one-to-one communication mode or to plural processor units in the multicast mode, and takes a value 0 or 1. This transfer type C indicates the multicast mode in case of the coherent read request. The request information generate logic (not shown) within the cache status control logic 354 generates this transfer type C, when it generates that request type, and supplies it to the register 360 through line 3644. The operations of the cache status control logic 354 described above are basically the same as or similar to ones of the prior art system which adopts the snoop method or can be easily designed by persons skilled in the art therefrom. So, the details of the logic will be omitted for the sake of simplicity.

The destination information is information designating the destination of this coherent processing request. The destination information is composed of a destination bitmap D-BITMAP which comprises plural bits each of a value 1 or 0 corresponding to all the processor units and all the memory units, when the coherent read request is one to be transferred to plural processor units in the multicast mode. This bitmap comprises the first to n-th bits designating processor units to which the coherent processing request should be transferred and (n+1)-th to (n+m)-th bits designating the memory units to which the processing request should be transferred.

The first to n-th bits designating processor units to which the coherent processing request should be transferred, within the destination bitmap D-BITMAP of the coherent processing request are generated by the destination information generate logic 470 (FIG. 6) in the multicast table control unit 450 by the method which will be explained later, and are supplied to the register 360 (FIG. 4) through line 4520.

The (n+1)-th to (n+m)-th bits designating the memory units to which the coherent processing request should be transferred within the designating bitmap D-BITMAP are sent to line 3570 by the memory destination generate logic 357 (FIG. 4) within the cache control unit 350. These bits are combined with another bitmap supplied to line 4520 by the multicast table control unit 450 and are supplied to the register 360 as the destination bitmap D-BITMAP. Thus, the destination information generation logic 470 (FIG. 6) and the memory destination generate logic 357 generate the destination bitmap D-BITMAP jointly. So, we can regard that these logics compose a destination information generate logic for a coherent processing request. The send control logic 353 generates the message which contains the coherent processing request and the transfer control information added to the coherent processing request held in the register 360, and sends it to the interconnection network 50.

(3C) Multicast table 400

Figure 5:
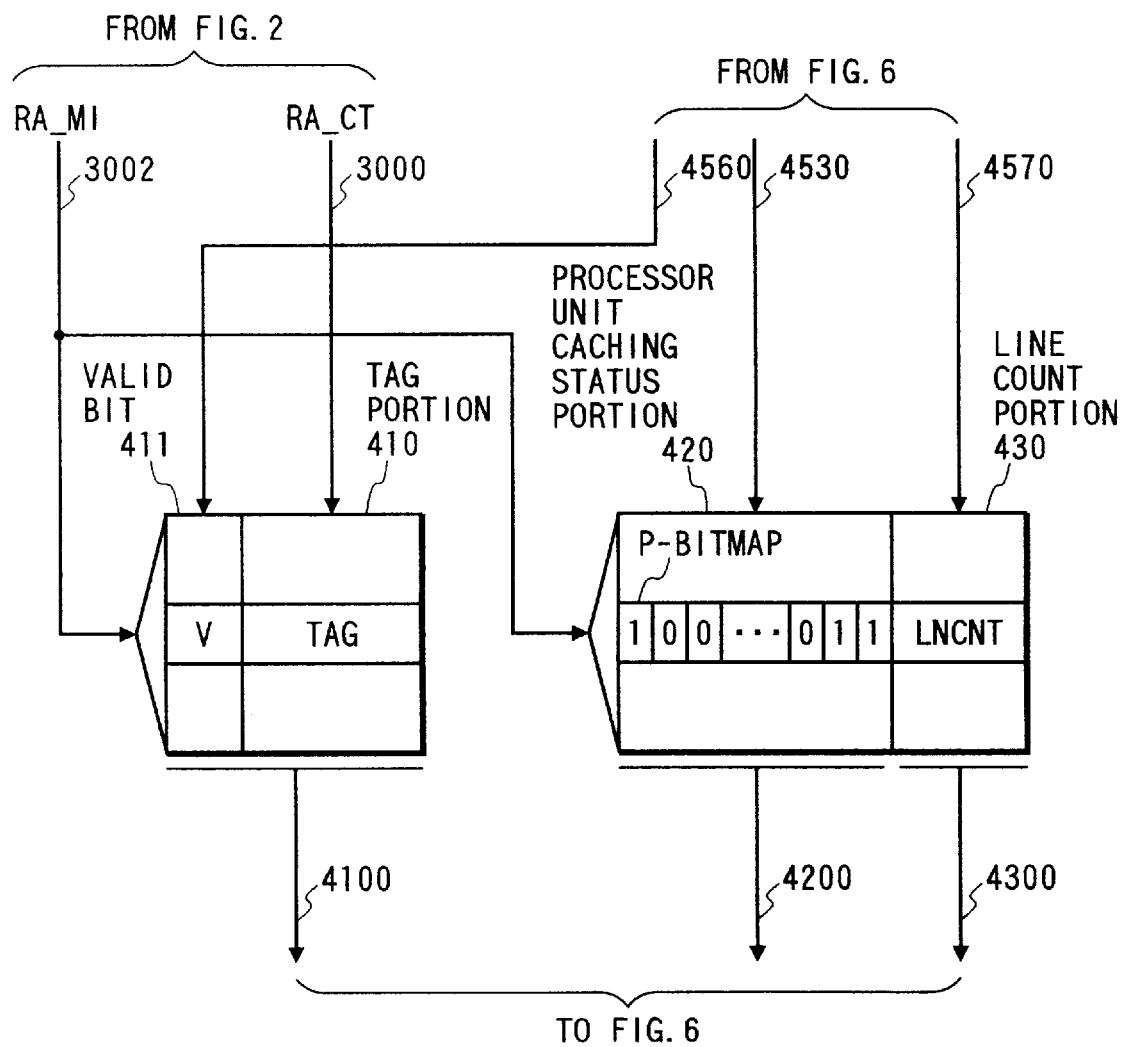
FIG. 5 is a schematic block diagram of a multicast table used in the apparatus of FIG. 1.

In the present embodiment, the coherent processing request is not transferred to all the processor units, but to part of the processor units. The multicast table 400 (FIG. 5) is used to achieve this limited transfer. In FIG. 5, the multicast table 400 contains the tag portion 410 for detection of hit/miss, the processor unit caching status portion 420, and the line count portion 430. The table 400 has plural entries and each entry corresponds to one of plural memory areas of the main memory 70. The tag portion 410 holds a tag for each entry used in searching this table 400 and a valid bit of the tag. The multicast table 400 is composed of a cache memory of a direct map like the cache memory 300.

Each entry corresponds to one of plural memory areas in the main memory 70. The memory area corresponding to each entry is decided so as to contain one or plural memory areas in which a cache line of the cache memory 300 is included. Therefore, the size of each entry has the size of an integer times of that of the memory area in which a cache line is included. For instance, we assume that the unit of memory management of the multicast table 400 is 1 KB, when the cache line size is 32 B. In this case, the memory area to which each entry of the multicast table 400 corresponds can include 32 cache lines. When the number of entries of the multicast table 400 is assumed to be 1K entries, the total of the range of the addresses which the multicast table 400 controls becomes 1 MB.

The upper 0th to 11th bits of the real address are stored in the tag of each entry, like the tag of the cache memory 300. It comes to that the index portion RA_MI for the multicast table 400 which comprises the 12th to 21st bits of the real address RA is used in accessing the multicast table 400.

Each entry of the processor unit caching status portion 420 comprises a bitmap and the position of each of the bits corresponds to one of the processor units 10-1 to 10-n. The value of the bit becomes 1 or 0, depending upon whether data which belongs to the address range (memory area) to which that entry corresponds is cached by a corresponding processor unit 10-1 , , , or 10-n. This bitmap maybe called as a processor unit caching status bitmap or simply as a caching status bitmap P-BITMAP. Thus, the multicast table 400 holds in correspondence to each of the memory areas included in the main memory, a status indicative of whether data which belongs to the memory area is cached by one of the processor units. This held status will be called a processor unit caching status.

The line count portion 430 is used to invalidate the caching status bitmap in each entry in the multicast table 400, when no data of the memory area corresponding to that entry is cached. When the entry is invalidated, the entry is used to hold the caching status concerning the other memory area. Concretely, each entry holds a line count LNCNT which shows the number of cache lines which belong to the memory area to which that entry corresponds and are cached by the processor unit including the multicast table 400. The multicast table 400 and the cache memory 300 are in an inclusive relation and data which belongs to the address range not controlled by the multicast table 400 does not exist in the cache memory 300.

Even if the caching status in an entry corresponding to the address designated by a memory access instruction shows that other processor unit caches data of the memory area corresponding to the entry, it does not come directly that the data which the memory access instruction designates is cached in that other processor unit, when the size of the memory area to which each entry corresponds is larger than the cache line size. Other data of the memory area might be cached. Even if the caching status of the entry corresponding to the address designated by a memory access request shows that other processor unit caches the data of the memory area corresponding to the entry, in case the size of the memory area to which each entry corresponds is equal to the cache line size, the processor unit may have changed the caching status afterwards. Therefore, the data is not necessarily cached in that other processor unit. Therefore, the caching status in table 400 designates other processor units which are likely to have cached the data of the address designated by the coherent request.

Therefore, the request is transferred only to that part of the processor units in the present embodiment. As a result, the number of processor units to which the coherent processing request is transferred is limited. As will be explained later on, when the memory areas to which data cached into the cache memory 300 belongs change in each processor unit, as a result of execution of a memory access instruction issued by CPU core 100 of its own, the multicast table control unit 450 renews a portion which relates to the processor unit among the caching statuses in the multicast table 400, according to the change and independently of other processor units.

When each processor unit sends a coherent processing request to other processor unit, it receives a report of a caching status in that other processor unit concerning the memory area to which the data of the address designated by the request belongs, in addition to a report of the cache status concerning the data of the address. The caching status concerning that other processor unit in the multicast table 400 is renewed based on this reported caching status. In this method, it is not necessary for each processor unit to notify other processor units of the updated caching status of its own, every time that processor unit renews the caching status of its own. Moreover, transfer of extra messages for notifying the caching statuses between the processor units is prevented.

However, there is a possibility that other process will invalidate the data before receipt of the source processor unit of the coherent request receives the next report from the other processor unit, even if the other processor unit caches the data of the memory area when the report is received. As a result, even if the caching status bitmap in the multicast table 400 shows at some timing that other processor unit has cached data of a memory area, it occurs that it is not true in that other processor unit. Transfer of the coherent processing request to the other processor unit will become useless. However, when the other processor unit newly caches the data afterwards which the other processor unit does not cache at the timing of the report, the new status will be notified to all other processor units in the present embodiment. As a result, each processor unit does not fail to send the coherent processing request to a processor unit to which the coherent processing request should be sent.

The control size of the multicast table can be any value so long as it is equal to or larger than the line size, which is the control size of the cache. If the control size of the multicast table is large, the capacity of the multicast table 400 can be small. However, if the control size of the multicast table is enlarged, there is a possibility that a pseudoshare status will be generated concerning the address not shared and this will increase the busy rate of the interconnection network 50. Therefore, it is preferable to decide an appropriate control size according to the amount of the gates which can be implemented and the throughput of the interconnection network 50.

As will be described later on, the memory data shared by different processor units is a lock control variable or a global variable, and these data are often placed on pages different from the pages for the usual data. Therefore, it can be said that it is effective to set the unit of control of the multicast table 400 in neighborhood of the page size (1 to 4 KB), when such characteristics of programs are considered. The constructing method of the multicast table 400 in the present embodiment adopts the direct map method, but general cache configuring methods, for instance, the set associative method or the full associative method, etc., may be adopted.

(3D) Generation of destination information

In parallel to execution of the cache access for the above-mentioned memory access instruction, the caching status bitmaps P-BITMAP and the line count LNCNT stored in the entry corresponding to the memory address designated by this memory access instruction are read out from the multicast table 400, in preparation for the cache miss (cache miss hit). That is, the index portion RA_MI for the multicast table 400 within the real addresses RA generated by the address translation by TLB 200 is supplied to the multicast table 400 through line 3002. The tag portion 410 reads out the valid bit (V) corresponding to this index portion and a tag, and sends them to the multicast table control unit 450 through line 4100. Similarly, the processor unit caching status portion 420 also reads the corresponding caching status bitmap P-BITMAP, and send it to the multicast table control unit 450 by line 4200.

Figure 6:
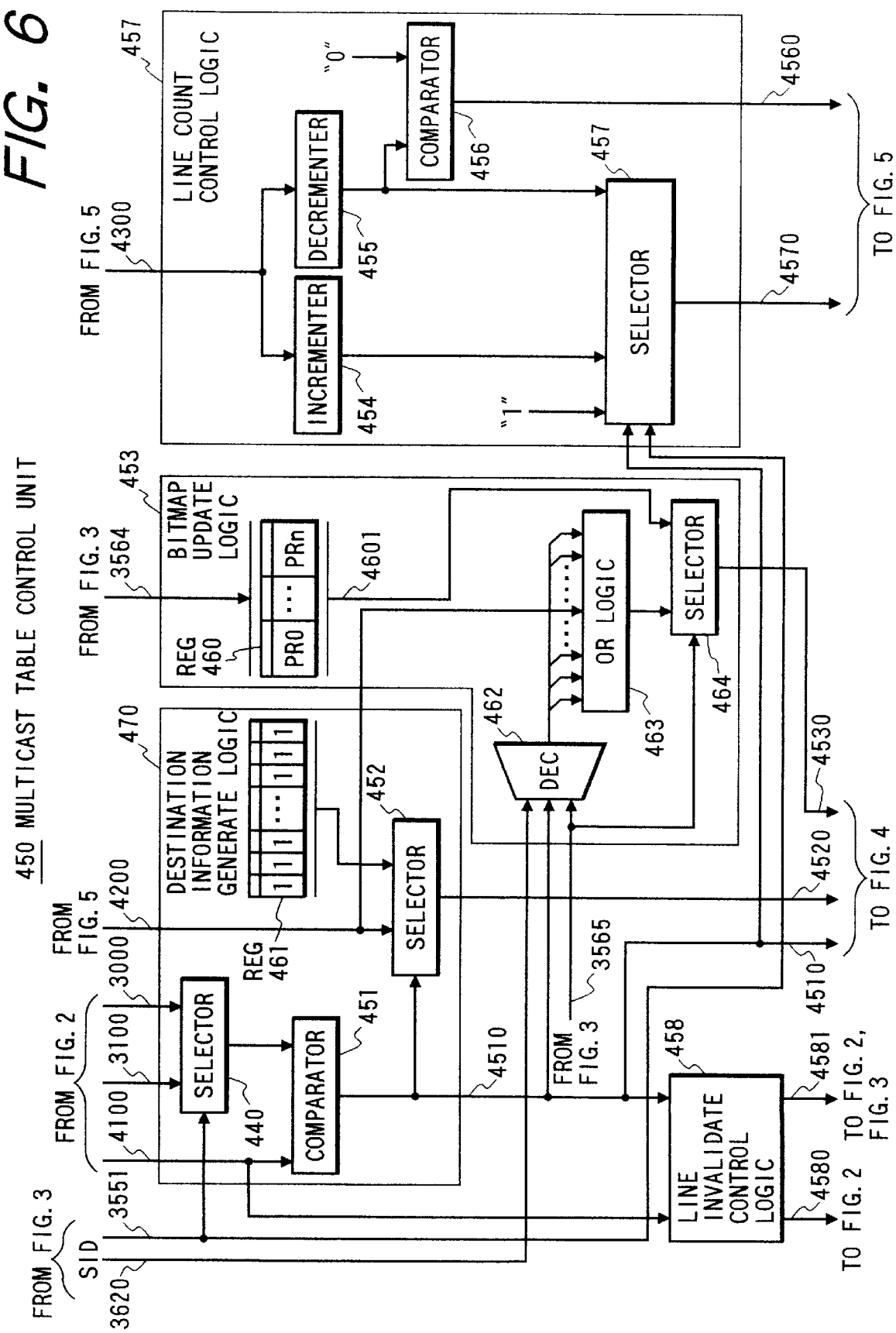
FIG. 6 is a schematic block diagram of a multicast table control unit used in the apparatus of FIG. 1.

Referring to FIG. 6, the destination information generate logic 470 in the multicast table control unit 450 generates the first to n-th bits for designating processor units to which the coherent processing request should be transferred, among the destination designating bitmap D-BITMAP of the coherent processing request. That is, the tag and the valid bit V read from the multicast table 400 are sent to comparator 451 by way of line 4100. In addition, the tag portion RA_CT of the real address used to access the multicast table 400 is transferred from the cache memory 300 through line 3000. The comparator 451 compares the tag read from the multicast table 400 and the tag portion RA_CT of the real address.

If the agreement is detected as a result of the comparison and the valid bit V shows validity of this tag, read from the multicast table 400 the comparator 451 asserts line 4510 to show that the multicast table 400 has hit. The caching status bitmap P-BITMAP read from the multicast table 400 is sent to selector 452 by way of line 4200. In addition, the bitmap stored in the register 460 is supplied to the selector 462. Because the read caching status bitmap P-BITMAP is used as part of the destination bitmap D-BITMAP as it is, when the multicast table 400 has hit, the destination information generation logic becomes simpler. Even when the information which shows processor unit caching statuses is used as destination information or as a portion of the information it is regarded in the present embodiment that the latter is generated from the former.

When the multicast table 400 hits, the selector 452 selects the former and sends it to the register 360 (FIG. 4) in the cache control unit 350 by way of line 4520. The bitmap whose all fields are "1" is held in the register 461 to designate all processor units as destinations of the coherent processing request. When the multicast table 400 misses, the selector 452 selects this bitmap. That is, because there is no information on whether another processor unit caches the data within the range of the address designated by the memory access instruction, all processor units are designated as destinations of the coherent read request.

(3E) Multicast control

The (n+1)-th to (n+m)-th bits which designate a memory unit to which the coherent processing request should be transferred, among the destination bitmap D-BITMAP is generated by the memory destination generate logic 357 (FIG. 4) provided in the cache control unit 350. The logic judges the main memory module to which the address designated by the memory access instruction under execution is allocated, based on the real address RA transferred from TLB 200 through line 2000 and the address allocation to the main memory modules 70-1 to 70-m. The logic generates the bitmap of m bit so that only the bit corresponding to the memory unit which includes the module becomes 1 and the bits corresponding to other memory units become 0. The logic supplies the bitmap to the register 30 together with another bitmap supplied to line 4520 from the multicast table control unit 450. Thus, the memory ID generate logic 357 cooperates with the destination information generation logic 470 previously described and generates the destination bitmap D-BITMAP, so the logic can be regarded a portion of the destination information generation logic. The send control logic 353 generates a message which contains the coherent processing request held in the register 360 and the transfer control information added thereto, and sends it to the interconnection network 50.

The interconnection network 50 transfers the coherent read request sent from the processor unit 10-i to part of other processor units and one main memory module 70-k designated by the destination bitmap D-BITMAP in the coherent read request, by way of different routes in parallel. The interconnection network 50 can start transfer of plural coherent processing requests which designate mutually different destination units at the same time, when those requests are sent from different processor units.

Figure 7:
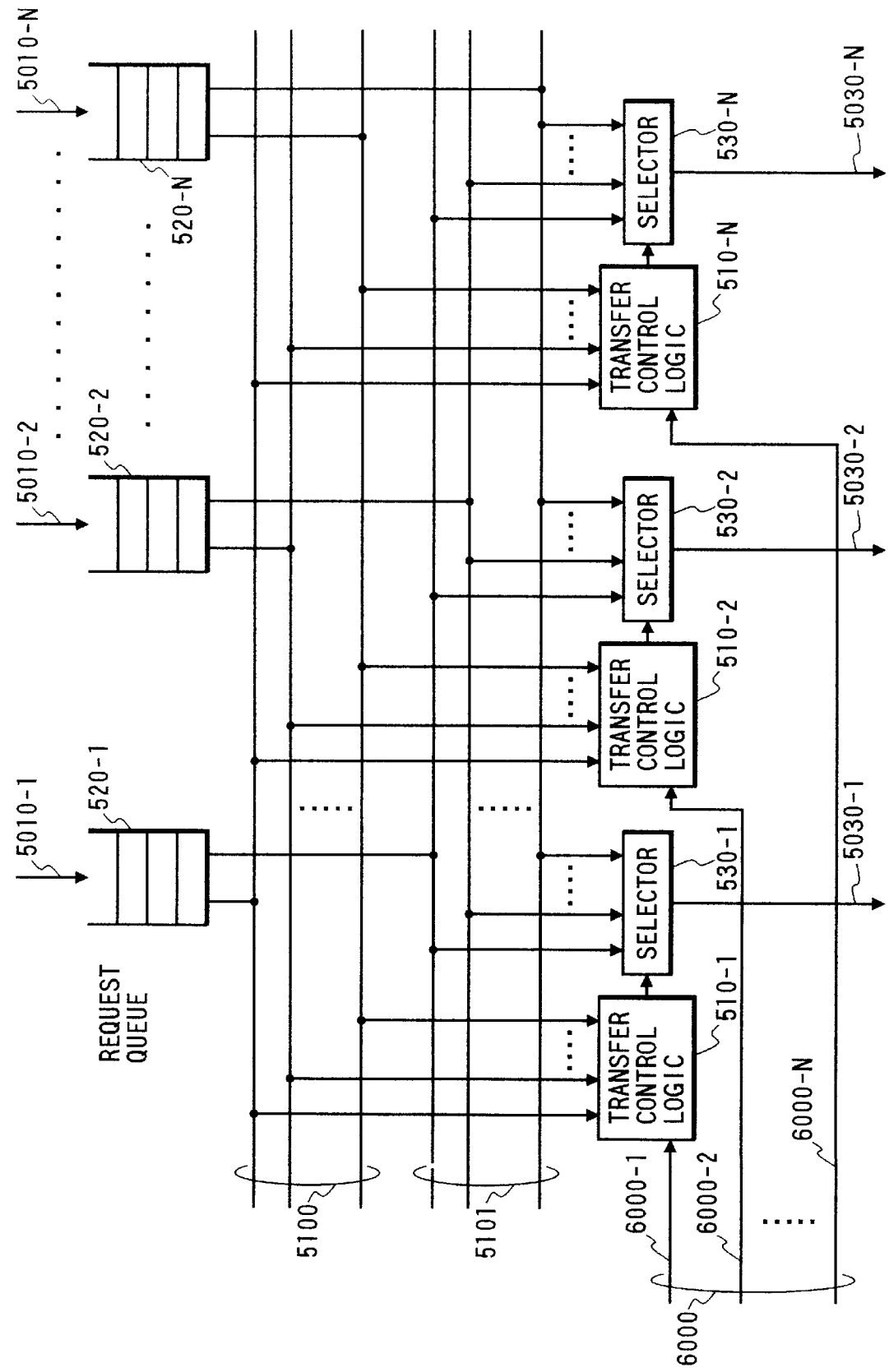
FIG. 7 is a schematic block diagram of a switch logic used in the apparatus of FIG. 1.

In FIG. 1, the interconnection network 50 contains the switch logic 500 for switching transfer routes between plural input ports and plural output ports and the multicast transfer control unit 600 characteristic to the present embodiment, for executing multicast by using this switch logic. In FIG. 7, the switch logic 500 comprises a crossbar switch, to be more concrete. The request queues 520-1 to 520-N are provided respectively corresponding to the plural units respectively connected by lines 5010-1 to 5010-N and respectively receive messages from the corresponding units sequentially. The output selector 530-1 to 530-N are provided in correspondence to the plural units connected respectively by lines 5030-1 to 5030-N, and the transfer control logics 510-1 to 510-N are provided in correspondence to the output selectors 530-1 to 530-N. The data path 5101 comprises N data paths each provided in correspondence to one of the request queues 520-1 , , , or 520-N, and each request queue 520-1 , , , or 520-N transfers the data portion of the message to all the output selectors 530-1 to 530-N through the corresponding data path. Here, N is a total number of the processor units 10-1 to 10-n, the memory units 700-1 to 700-m and the peripheral circuit units (not shown). The control path 5100 comprises N control paths each provided in correspondence to one of the request queues 520-1 to 520-N.

Each request queue 520-1 , , , or 520-N supplies the transfer control information of the message to all transfer control logics 510-1 to 510-N through the control path 5100. Each transfer control logic, for instance, 510-1 controls its corresponding output selector 530-1, so as to select the message held at the head position of a request queue, for instance, 520-2 when the transfer type C of the message indicates one-to-one communication, and the destination information of the message designates the unit corresponding to the transfer control logic 510-1. Each request queue arbitrates plural messages and selects one of them, when they designate the same unit. The transfer control logic 510 enables that selector to execute the selection of the messages after confirming that the unit corresponding to it is in a state it can receive a message. A message indicating the multicast mode is processed as follows.

Figure 8:
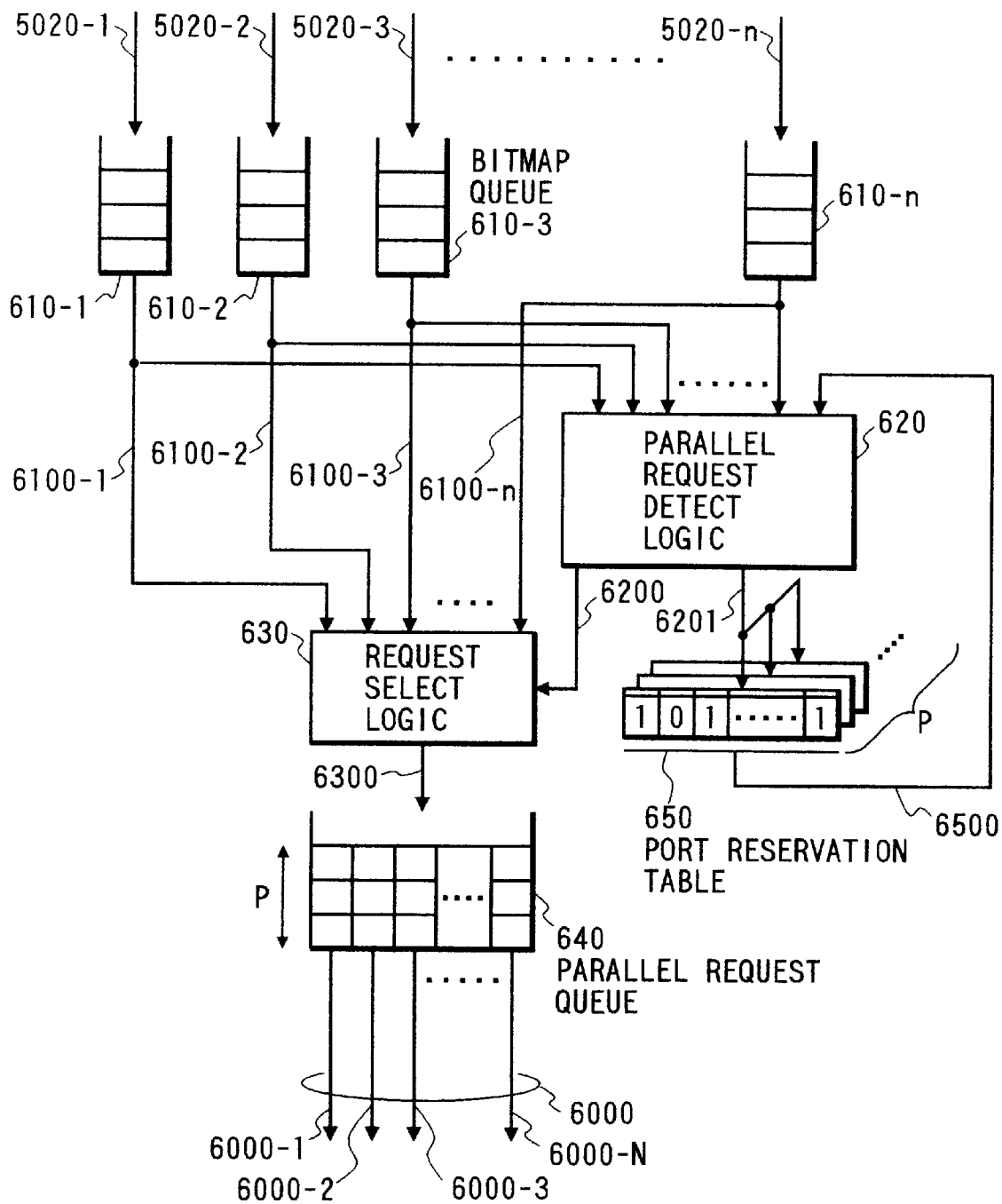
FIG. 8 is a schematic block diagram of a multicast transfer control unit used in the apparatus of FIG. 1.

In FIG. 8, the multicast transfer control unit 600 has the bitmap queues 610-1 to 610-n which temporarily holds requests from the processor units, the port reservation table 650, the parallel request detect logic 620, the request select logic 630 and the parallel request queue 640. Because the multicast requests are not from the main memory modules 70-1 to 70-m, the bitmap queues 610-1 to 610-n are provided in correspondence to the processor units 10-1 to 10-n. The bitmap queues 610-1 to 610-n take the destination bitmaps D-BITMAP of messages newly supplied by processor units corresponding to the request queues 520-1 to 520-n corresponding to the bitmap queues 610-1 to 610, when the transfer types C of the message indicate multicast.

The parallel request queue 640 comprises plural (p) entries, and each entry comprises plural fields respectively corresponding to the output port selectors 530-1 to 530-N in the switch logic 500. Each field holds the port number of one request queue which the corresponding output port selector should select, among the request queues 520-1 to 520-n, as will be explained below. The port reservation table 650 comprises p pieces of port reservation tables corresponding to the p entries of the parallel request queue 640. Each table is a bitmap which comprises the bits corresponding to plural output ports of the switch logic 500. Each bit indicates shows whether the corresponding output port has already been reserved for a multicast request, as will be shown below.

The parallel request detect logic 620 sequentially selects the bitmap queue 610-1 to 610-n according a predetermined order, and it reserves, according to the destination bitmap D-BITMAP in the multicast request located at the head position (output side) of the selected bitmap queue, the multicast request in the bitmap in one of the port reservation tables 650. First of all, if the bits corresponding to plural destinations which the multicast request requests are all "0" among the bitmap in the one port reservation table 650 corresponding to the head entry (output side) of the parallel request queue 640, the multicast request can be reserved in the head entry of the parallel request queue 640, and plural bits corresponding to those destinations in the bitmap are set to "1". If reservation is not possible to the port reservation table 650, the parallel request detect logic 620 checks whether reservation is similarly possible with the next port reservation table 650 corresponding to the next entry of the parallel request queue 640, and executes the same reservation operation sequentially for other port reservation tables 650 until reservation become possible.

When it turns out that the multicast request can be reserved to one of the port reservation tables, the parallel request detect logic 620 sets plural bits corresponding to plural destination, designated by the multicast request to "1", among the bitmap in the one port reservation table. In addition, the parallel request detect logic 620 notifies the request select logic 630 of the currently selected bitmap queue and the port reservation table having been used for the reservation. The request select logic 630 registers this multicast request in one entry corresponding to this notified port reservation table, among the plural entries of the parallel request queue 640 in the following manner. That is, the port number of the notified bitmap queue is stored in the field corresponding to the destination designated by the multicast request, among plural fields in this entry. The port number of the bitmap queue is equal to the port number of the corresponding request queue and is used to select by the switch logic 500, a message which should be transferred next from the request queues 520-1 to 520-N. Thus, the multicast request is registered in the parallel request queue 640.

When the reservation operation is executed to one port reservation table 650, as described above, all the bits of the bitmap of the port reservation table 650 need not be 0, so as to succeed in the reservation. If the output port requested by the succeeding multicast request is not reserved, even if the bitmap has already been reserved concerning part of the output ports for other preceding multicast request, the succeeding multicast request is reserved in the port reservation table together with the preceding multicast request. Thus, the multicast request which has already been reserved to the same port reservation table 650 and the succeeding multicast request will be executed in parallel. Such a reservation operation and the operation of the parallel request detect logic 620 are similar to the technique of scoreboarding in the super-scalar processor units, and can be easily realized.

The parallel request queue 640 sequentially transfers plural multicast requests registered in plural entries of that queue to the transfer control logic 510-1 to 510-N in the switch logic 500, starting from one registered in the head entry (output side) of the queue. That is, the port number registered in the entry is sent as a selector control signal by way of line 6000. In the switch logic 500, the transfer control logic 510-1 to 510-N control the corresponding output port selectors 530-1 to 530-N according to the control signal sent by way of line 6000. As a result, plural output port selectors will select the same request queue. Thus, the coherent read request from the processor unit is multicast by the interconnection network 50 to part of the processor units to which has cached the data requested by the coherent read request.

(3F) Snoop processing

The processor unit 10-j which has received the coherent read request generates a coherency status notice which notifies the request source processor unit 10-i of the cache status of the data of the address designated by this request for maintenance of cache coherency, as in the known snoop processing. In addition, when the processor unit 10-j holds the recent data of the cache line designated by the coherent read request, that is, when the cache status of that cache line is M, the processor unit transfers the data of that cache line to the request source processor unit and decides a new cache status of the data. When that cache status is notified, the processor unit caching status in the multicast table 400 concerning the memory area which includes the address designated by the received coherent request is also notified in the present embodiment. This processor unit further renews the portion concerning the request source processor unit among the processor unit caching statuses held in the multicast table 400, in response to receipt of the coherent processing request.

First, the detection of the cache status is executed as follows. In the processor unit 10-j, the receive control logic 356 (FIG. 3) in the cache control unit 350 receives the coherent read request which has arrived from the interconnection network 50 by way of line 5030. The receive control logic 356 cuts out the request type "TYPE" and the identifier SID of the request source processor unit in the request, and sets them in the registers 361 and 362 respectively by lines 3560 and 3561. The receive control logic 356 further cuts out the real address RA given by the source processor unit, and sends it to the selector 150 (FIG. 2) of the cache memory 300 by way of line 3563. It further sends the signal which shows receipt of the message from another unit through line 3565 to the selector 150 (FIG. 2) in the cache memory 300, the cache status control logic 354 (FIG. 3) in the cache control unit 350, and the bitmap update logic 453 (FIG. 6) in the multicast table control unit 450. The selector 150 responds to this signal 3565, selects the received real address RA and stores it in register 201. The cache memory 300 accesses the cache tag portion 31 with this received real address RA. The hit detect logic 352 judges hit/miss to this received real address by the procedure similar to one used at issue of the coherent read request, and notifies the cache status control logic 354 of the result of this judgment through line 3520. The hit condition of the cache is similar to the case where the memory access instruction issued by CPU core 100 is a memory load instruction.

The cache status control logic 354 decides information to be notified to the received coherent processing request, and sets it in register 370 (FIG. 4). This operation is started by the signal indicative of receipt of the message from another processor unit 10-i, which is given from the receive control logic 356 by line 3565. The cache status control logic 354 generates the cache status ST to be notified, based on the result of that hit check and the status read from the cache memory 300, in the following manner. The state to be notified is I in case of cache miss, and is the same as the cache status ST read from the cache memory 300 and given through line 3206, in case of cache hit. The cache status control logic 354 supplies the determined cache status ST to be notified to the register 370 through line 3540.

The processor unit caching status to be notified from the multicast table 400 is decided as follows. In parallel to the above-mentioned access to the cache memory 300, the tag portion RA_MI of the received real address RA in the register 201 (FIG. 2) is sent to the multicast table 400 by way of line 3002. The multicast table 400 searches whether there is a processor unit caching status of the memory area which includes that cache line in the multicast table 400, and in case there is such a status, the multicast tabled 400 reads the processor unit caching bitmap of the corresponding to the memory area. The comparator 451 (FIG. 6) in the multicast table control unit 450 executes a hit/miss check of the multicast table 400, based on the result of this search by the procedure similar to one at issue of the coherent read request, and supplies the caching status bit PR which becomes value 1 or 0 by hit or mishit to the register 370 (FIG. 4) through line 4510. The identifier RID of the return source processor unit of the coherency status is further supplied to the register 370. RID shows the port number in the interconnection network 50 of the return source processor unit, like SID.

The identifier RID of the return source processor unit is supplied from the register (not shown) in this processor unit. Thus, information to be notified which comprises the cache status ST, the processor unit caching status bit PR and the identifier RID of the return source processor unit is supplied to the register 370. The following transfer control information is also supplied to the register 370. That is, the identifier SID of the request source processor unit set in register 362 is supplied to the register 370 through line 3620 as the destination information.

As the transfer type C of this information to be notified, the cache status control logic 354 (FIG. 3) supplies this register 370 with the value 0 which indicates that the information should be transferred by the one-to-one communication mode. The cache status control logic 354 supplies the register 370 with the signal 3545 which indicates that the above-mentioned signal is to be set. Thus, a reply message of the coherency status and the transfer control information to it are stored in the register 370. The send control logic 353 sends the information in this register 370 to the interconnection network 50. Thus, this reply message is transferred to the request source processor unit according to the identifier SID of the request source processor unit. Thus, in the present embodiment, the processor unit caching status is notified to the request source processor unit together with the notification of the cache status to the coherent processing request, so it is not necessary to exchange a new message for the notification of the caching status between the processor units.

When the cache status control logic 354 (FIG. 3) has judged that the data of the address designated by the received coherent processing request hits and the cache status of the data is the M status, the cache status control logic 354 notifies the send control logic 353 (FIG. 4) that the data read from the cache memory 300 should be sent to the source processor unit 10-i of the request by way of line 3520, so as to transfer the hit data to the request source processor unit, like in a known system of the snoop method. The data read from the cache memory 300 is supplied to the send control logic 353 through line 3300. The identifier SID of the request source processor unit is supplied from the register 362 (FIG. 3) to the send control logic 353 through line 3620, as destination information of this data. Thus, the send control logic 353 generates the message which includes the data and the identifier SID read from the cache memory as its destination. This message is transferred to the request source processor unit by the interconnection network 50.

The transfer time of this data is very large compared with the transfer time of the above-mentioned cache line status notice. In general, the access time of the data portion 330 of the cache memory 300 is larger than that of the tag portion 310. The amount of information of this data is larger than that of the cache line status notice, so the transfer time of the cache data on the interconnection network 50 is larger. As a result, the transfer time of the cache line status notice is hidden in the data transfer time. As a result, the transfer time required of the processor unit which has sent the coherent read request to read that data are substantially decided depending on the transfer time of the coherent read request and the receive time of the data designated by the request.

The network interface unit 750-1 in the memory unit, for instance, 700-1, which has received the coherent processing request reads the data of the address designated by the request from the corresponding main memory module 70-1 and transfers it to the request source processor unit. This transferred data is used by the request source processor unit when none of the plural processor units which have received the coherent processing request holds the data of the address designated by the request in the M status.

The multicast table control unit 450 renews the processor unit caching status portion 420 (FIG. 5) in the multicast table 400, in response to receipt of this request coherent read. That is, the hit check result 4510 by the comparator 451 in FIG. 6 is sent to the bitmap update logic 453. The decoder 462 of the bitmap update logic 453 is notified of the receipt of the message from another processor unit 10-i by line 3565, is notified by the comparator 451, of the hit of that entry through line 4510 and is notified of the identifier SID of the request the source processor unit 10-i of the received coherent processing request through line 3620.

When the multicast table 400 hits, the decoder 462 responds to these signals and generates the bitmap which has only one bit of 1 corresponding to the identifier SID of the request source processor unit and bits of 0 for other processor units. The OR logic 463 ORs the bitmap read from the multicast table 400 to line 4200 and the bitmap which the decoder 462 has generated. The selector 464 responds to the receive signal of the message on line 3565, and writes the bitmap generated by this OR gate into the processor unit caching status portion 420 of the multicast table 400 through line 4530.

This updating enables the processor units which received that coherent read request to store that the processor unit which transferred the coherent read request has newly cached the data. That is, the processor unit which received the coherent read request can store change of the cache lines in other processor units. Therefore, the processor unit which received the coherent read request can notify other processor units which cache that cache line of change of the status of that cache line, when the status of that cache line changes.

The cache status control logic 354 decides the next status to the cache status ST read from the cache memory 300, stores that next status in the corresponding entry in the status portion 320 by way of line 3541. That next status is different depending upon the read cache status ST and the kind TYPE of the coherent processing request stored in the receive control logic 356, like in the known system of the snoop method. For instance, the next status becomes S, when TYPE is the coherent read request originating from load miss and the read status ST is E or S. The next status becomes I, when TYPE is the coherent read request originating from load miss and the read status ST is M. The next status becomes I, when TYPE is the coherent read-invalidate originating from store miss, irrespective of the value of the read status ST.

(3G) Accumulation of cache status notices

The request source processor unit 10-i of the coherent read request receives the cache line status notices from all of destination processor units of the request, accumulates these notices, and determines the new status of that cache line designated by this request, based on the result of the accumulation. When the requested data is transferred from one of the processor units, the request source processor unit caches the data, and, otherwise, caches the data transferred from the memory unit. In the present embodiment, the request source processor unit further renews the cache statuses of respective processor units in the multicast table 400 based on the processor unit caching status included in respective cache line status notices.

First, in FIG. 3, the register 363 has the fields corresponding to all the processor units, and is provided to accumulate respective cache statuses. Whenever a coherency status response is received from other processor unit, the receive control logic 356 (FIG. 3) cuts out the cache status ST and the source identifier RID included in the coherency status response, and stores the cache status ST in the corresponding field in the register 363 designated by the source identifier RID by line 3562. The status I is set beforehand in the fields in the register 363 corresponding to processor units to which the coherent processing request is not sent. The cache status control logic 354 determines the next cache status of the newly acquired data, based on the caches statuses of other processor units collected in the register 363, as follows.

To be more concrete, when the coherent processing request which the request source processor unit previously issued is a coherent processing request which originated from cache miss for a memory load instruction, the decision method becomes the following. If all the statuses of the register 363 is I, the next status is E. If a status E or at least one status S exists in the register 363, the next status is S. If a status M exists in the register 363, the next status is M. On the other hand, when the coherent processing request which the request source processor unit previously issued is a coherent read-invalidate request which originates from cache miss for the memory store instruction, the next status becomes M regardless of cache statuses in the register 363. The next status thus decided is sent to the status portion 320 in the cache memory 300 by way of line 3541. The receive control logic 356 sends the cache memory 300 the real address RA included in the received coherent status response, through line 3563. Thus, the tag to the new data and the status thus decided are stored in the tag portion 310 and the status portion 320 of the cache memory 300.

When the requested data is transferred from a processor unit or a memory unit, the data is stored in the data portion 330 of the cache memory 300. That is, the receive control logic 356 sends the cache memory 300 the received data and the source identifier SID attached to the data by way of line 3566. The cache memory 300 stores the sent data either in the memory data register 341 or in the cache data register 342, depending on whether the source identifier is for one of the memory units or one of the processor units. When the next status previously decided by the cache status control logic 354 is M, the selectors 345 and 346 select the data in the cache data register 342 according to the control signal 3550, and stores it in the data portion 330. Otherwise, the selectors 345 and 346 select the memory data register 341, and stores it in the data portion 330. This selected data is sent to CPU core by way of gate 371 and line 1001.

The multicast table control unit 450 accumulates processor unit caching status bits PR included in the plural cache line status notices received from the plural processor units, and reflects the result of the accumulation in the processor unit caching statuses concerning for respective processor units in the multicast table 400 concerning the memory area to which the data requested by the coherent processing request belongs. First, whenever the receive control logic 356 receives a cache line status notice, it cuts out the processor unit caching status bit PR and the source identifier RID included in the notice, and transfers them to the register 460 (FIG. 6) in the multicast table control unit 450 through line 3564. The register 460 possesses the fields for all the processor units and stores the processor unit caching status bit PR in the field designated by the source identifier RID. In the fields of the register 460 corresponding to processor units to which the coherent processing request was not sent, 0 is set beforehand. Thus, the processor unit caching bitmap concerning the memory area to which the address designated by the coherent processing request belongs is formed in the register 460.

The selector 464 selects this bitmap, and sends it to the processor unit caching status portion 420 of the multicast table 400 through line 4530. As already described, the receive control logic 356 cuts out the real address RA included in the received reply, and sends it to the cache memory 300. The tag portion RA_MI in the real address is supplied to the multicast table 400 (FIG. 5) through line 3002. Therefore, this bitmap is written in the multicast table 400 as one indicative of the recent caching status concerning the memory area to which the address designated by the coherent request belongs. When the entry for this memory area does not exist in the multicast table 400, this writing is done after execution of replacement of entries, as will be described later.

As a result, processor units to which that cache line is cached other than the request source processor unit of the coherent read request are reflected in the caching status portion 420. Therefore, when the status concerning that cache line is changed in the future, it is enough to execute processing corresponding to the change of the status, to the processor units set in this bitmap. It is not necessary to execute the processing corresponding to the change of the status concerning the cache line, to processor units other than those set in the bitmap. As a result, the number of messages between processor units can be decreased, and the busy rate of the interconnection network 50 can be decreased.

(3H) Cache line store operation/Cache line replacement

When a new cache line is stored in the cache and old cache line is replaced, increment or decrement of the line count LNCNT of the multicast table 400 corresponding to this cache line is executed. The line count LNCNT of each entry of the multicast table 400 becomes 0 when no data is cached in the cache memory 300, among data which belongs to the range of the address to which the entry corresponds. In the present embodiment, the entry is invalidated at that time, and distribution of a coherent read request for that range of the address is prevented from then on. The line count LNCNT is used to judge the timing of this invalidation.

The case where an old cache line is replaced is considered first. The index portion RA_CI of the real address RA used to access the cache memory 300 and the tag read from the cache memory 300 are combined, and the replace address is generated. The index portion RA_MI in this replace address is sent to the multicast table 400 by way of line 3002. The multicast table 400 reads the tag and the line count LNCNT of the corresponding entry, and sends them to the multicast table control unit 450 through line 4100 and 4300, respectively. The tag portion RA_CT of the replace address is sent to the selector 440 in the multicast table control unit 450 by way of signal line 3100. The selector 440 selects the signal line 3100 according to the output 3551 of the replace/fill control logic 355, and sends it to the comparator 451. The comparator 451 executes a hit-check in the same method as described already.

In case of hit, the decrementer 455 in the line count control logic 459 decreases the read line count LNCNT by one. The comparator 456 compares the updated line count with "0", generates the multicast table invalidate signal, if the line count LNCNT is equal to 0, and sends the signal to the multicast table 400 by way of the line 4560. The multicast table 400 receives the multicast invalidate signal and changes the valid bit V corresponding to that entry to "0". The replace/fill control logic 355 notifies that a cache line has been replaced, by signal line 3551. The selector 457 responds to this signal 3551 and the hit signal 4510 from the comparator 451, selects the line count LNCNT after decrement, sends it to the multicast table 400 by way of the signal line 4570, and stores it in the line count portion 430. At replacement of a cache line, the status ST of that cache line is changed to I, and, if that status ST of that entry shows M, the corresponding data is read from the data portion 330 and write back is executed to the main memory 70.

If the entry of the multicast table 400 corresponding to a new cache line does not exist, when the cache line is stored, the multicast table entry is generated, and "1" is stored in a corresponding line count LNCNT afterwards. When the entry already exists, the line count LNCNT is read and is supplied to the incrementer 454 (FIG. 6) of the line count control logic 459. The incrementer 454 increments the line count LNCNT by one. The selector 457 selects the incremental line count LNCNT, and stores it in the line count portion 430 of a pertinent entry of the multicast table 400. The real address used at storing of a cache line is sent for hit check of the multicast table 400 by way of the line 3563, and is selected by using the selector 150. Afterwards, hit check is executed, as in generating the coherent read request mentioned above.

(3I) Replacement of the multicast table entry

When an entry of the multicast table 400 is replaced, it is necessary to flush all the cache line included in the range of the address corresponding to that entry. The line invalidate control logic 458 receives the tag portion to the entry of a replace target by way of the line 4100, increments it in unit of a cache line address, and sends the address after incrementing to the cache memory 300 by line 4580. The line invalidate control logic 458 further controls the selector 150 by line 4581, so as to select the real address RA to be used in the flush processing. The cache control unit 350 executes hit check of the cache memory 300 by using this selected RA, according to the same procedure as described already.

The cache status control logic 354 judges whether that entry hits and the cache status ST is not M, based on the notification from the hit detect logic 352, the cache status of that entry by line 3206 and the invalidate request notified by line 4581. When this condition is fulfilled, the cache status control logic 354 invalidates the entry, and, when that entry hits and the cache status ST is M, the logic 354 writes back the data of the entry to the main memory 70 by way of the interconnection network 50, and invalidates the entry afterwards. The writeback processing is similar to the usual write back processing, so the explanation of a necessary logic and its operation will be omitted.

In FIG. 4, when CPU core 100 issues a memory access request to the data which belongs to the address area predetermined not to be cached, the address designated by the instruction is transferred to the send control logic 353 through line 1003. The operation of the apparatus at this time will be explained in the embodiment 2 to be described late on.

In the embodiment above, the operation was explained on the assumption that each processor unit has the circuit element of its own, but the cache memory 300, the cache control unit 350, the multicast table 400, and the multicast table control unit 450 explained here can be shared by plural processor units.

The data to be shared in the online transaction processing or the data base processing, etc., is lock control variables or global variables, etc., but their use frequency and the amount of the data are very small compared with the data not shared. Therefore, it is expected that in most cases the bitmap portion of each entry in the multicast table 400 has "1" for the processor unit which includes the multicast table and 0 for other processor units. Therefore, the effect of reduction of the busy rate of the interconnection network 50 by the multicast control is high. By using the parallel multicast transfer control described in the present embodiment, the problem of the bus congestion by the coherent read requests in the shared bus is considerably improved.

Embodiment 2

(1) Structure of the Apparatus

Figure 9:
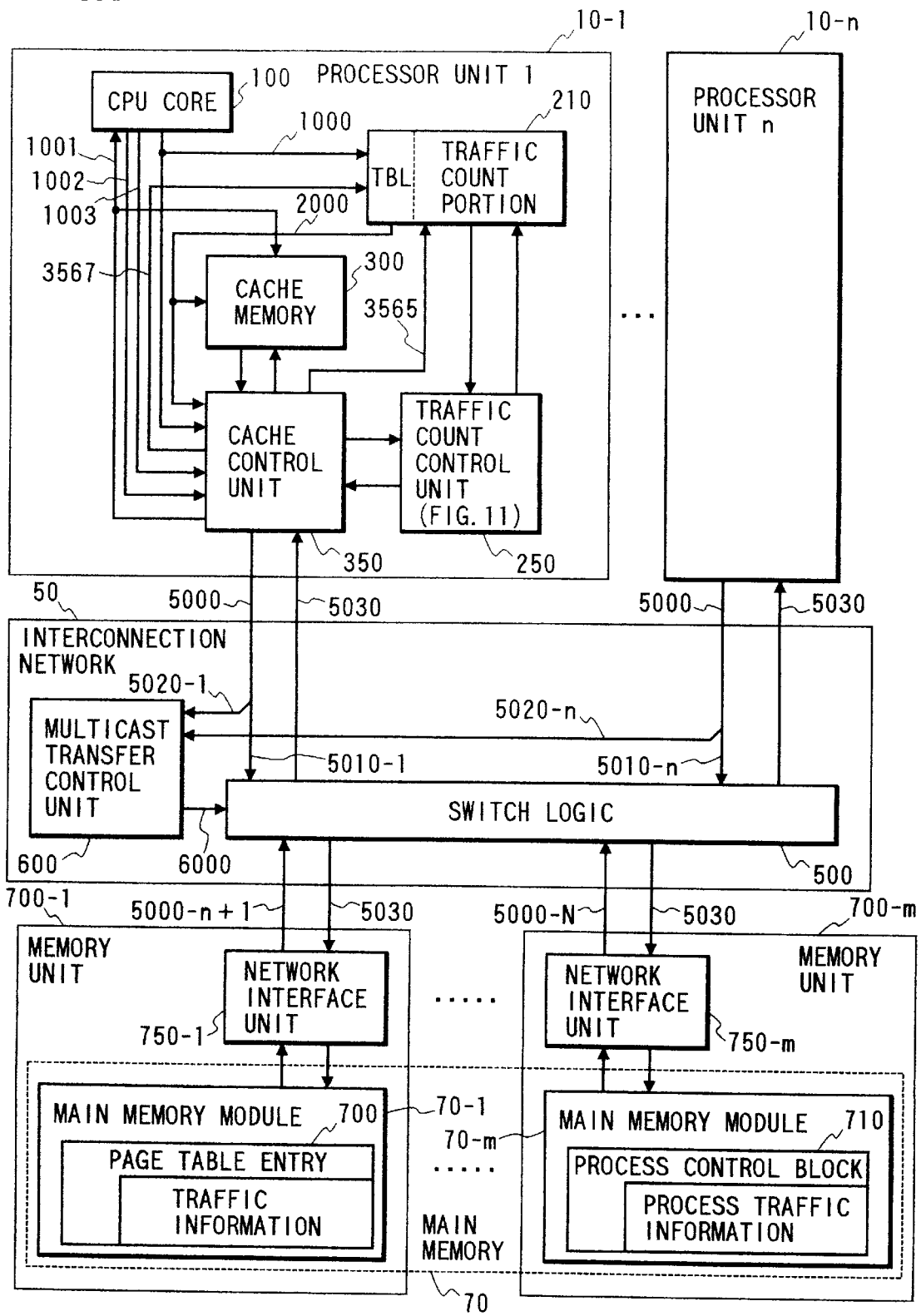
FIG. 9 is an overall structure of another multiprocessor system according to the present invention.

The present embodiment stores the processor unit caching status in TLB 210 in the multiprocessor system by the present embodiment in FIG. 9, in place of the multicast table 400 in the embodiment 1. In addition, the traffic count map which comprises the traffic count to each processor unit is stored as information indicative of the processor unit caching status, in place of the bitmap which contains one bit by which the caching to each processor unit is shown in the embodiment 1. Traffic count control unit 250 is used in place of the multicast table control unit 450 in the embodiment 1. The cache control unit 350 is basically the same as that of the embodiment 1. TLB 210 is accessible from software, so these pieces of information can be accumulated in unit of a page or a process.

(2) Generation of the Coherent Processing Request

Figure 10:
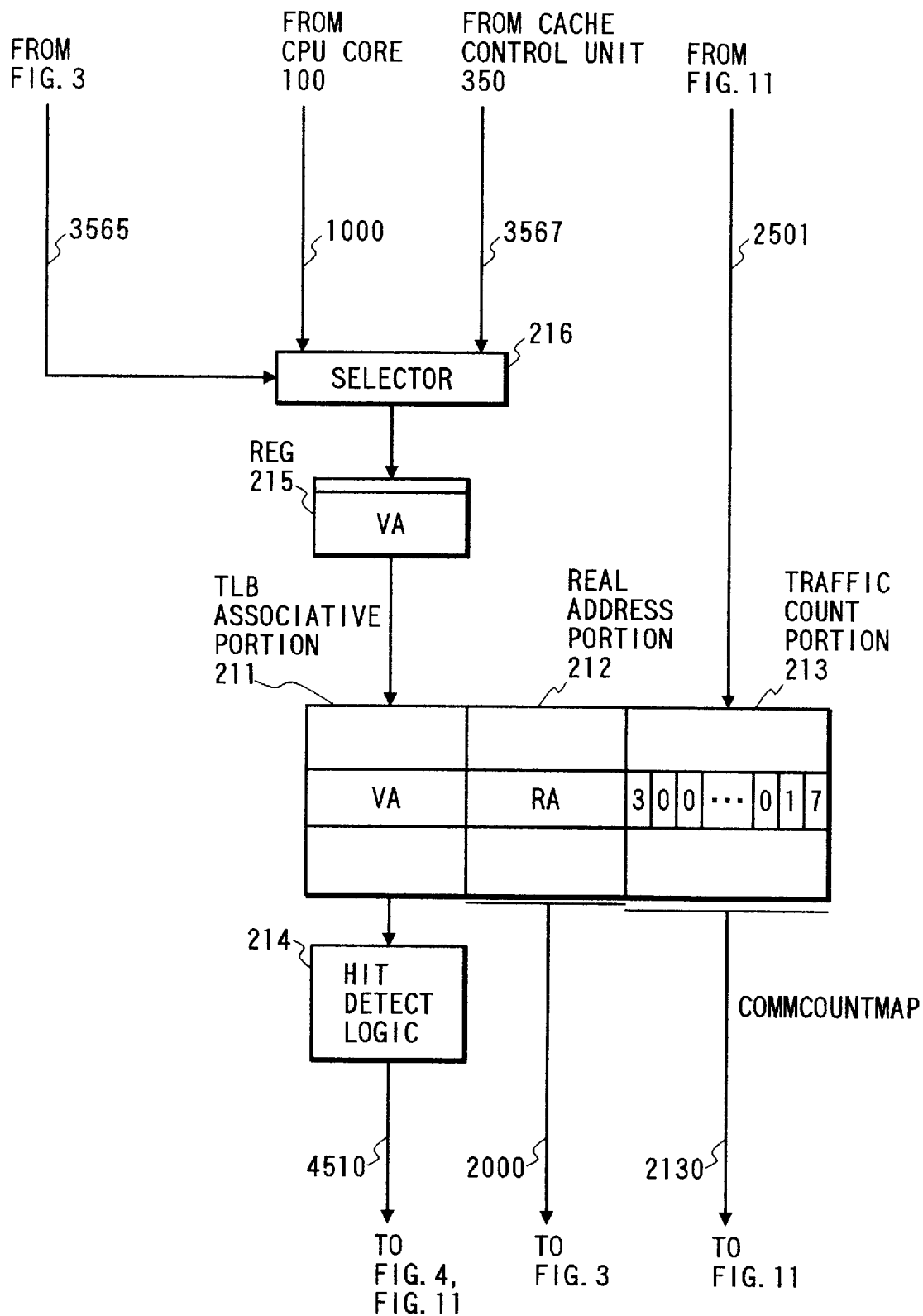
FIG. 10 is a schematic block diagram of TLB used in the apparatus of FIG. 9.

Referring to FIG. 10, TLB 210 has the TLB association portion 211, the real address portion 212, and the traffic count portion 213 characteristic to the present embodiment. TLB 210 is divided into plural entries, and each entry stores the virtual address, the real address RA obtained by translating the virtual address VA, and the traffic count map to the page area indicated by the real address. TLB 210 searches for a virtual address coincident to the virtual address given from outside. It outputs the real address to the virtual address and the corresponding traffic count map COMMCOUNTMAP, if the coincident virtual address is found.

The traffic count map COMMCOUNTMAP to each processor unit is stored in correspondence to a memory area, one page in the present embodiment, in the main memory 70. Each of the fields corresponds to one of all the processor units 10-1 to 10-n of the system. Each field of the traffic count map COMMCOUNTMAP is a sum of the cache coherent status notices indicative of the TLB' hit which have been sent back from other processor units to plural coherent processing requests which the processor unit containing the TLB sent concerning data of the page to which the map corresponds. The number r of bits of each field is decided by the tradeoff of a necessary amount of information and the gate scale. It is assumed r=4 here.

The traffic count shows the traffic count concerning cache control with other processor units. When a swapped out process is assigned to a processor unit again in the future, the OS can execute the assigning, with taking the caching statuses, etc., of other processor units into consideration, by knowing this traffic count. It will become possible to improve the effect of the entire multiprocessor system. In the present embodiment, TLB 210 is assumed to be full associative type.

When a memory access instruction is executed by CPU core 100 of a processor unit 10-i, the virtual address VA is sent to TLB 210 by way of line 1000. In TLB 210, the selector 216 selects the virtual address VA from line 1000 and stores it in the register 215. TLB association portion 211 is searched by using the virtual address VA stored in the register 215. The hit detect logic 214 hit-checks the searched virtual address and the real address RA corresponding to the hit entry is output. Simultaneously with this, the traffic count map COMMCOUNTMAP corresponding to the hit entry is read. When the signal 3565 indicative of receipt of a message from the receive control logic 356 (FIG. 3) provided in the cache control unit 350 is not asserted, the selector 216 selects the real address on line 1000. The real address RA obtained by TLB 210 is sent to the cache control unit 350 by way of line 2000. The obtained traffic count map is sent to the traffic count control unit 250 by way of line 2130.

The cache control unit 350 executes cache hit/miss check to the real address as in the embodiment 1. It generates a coherent read request, when the cache memory 300 misses, and sends it to other processor units 10-j through the interconnection network 50. The destination bitmap D-BITMAP used this time is generated by the traffic count control unit 250 in the present embodiment as follows.

Figure 11:
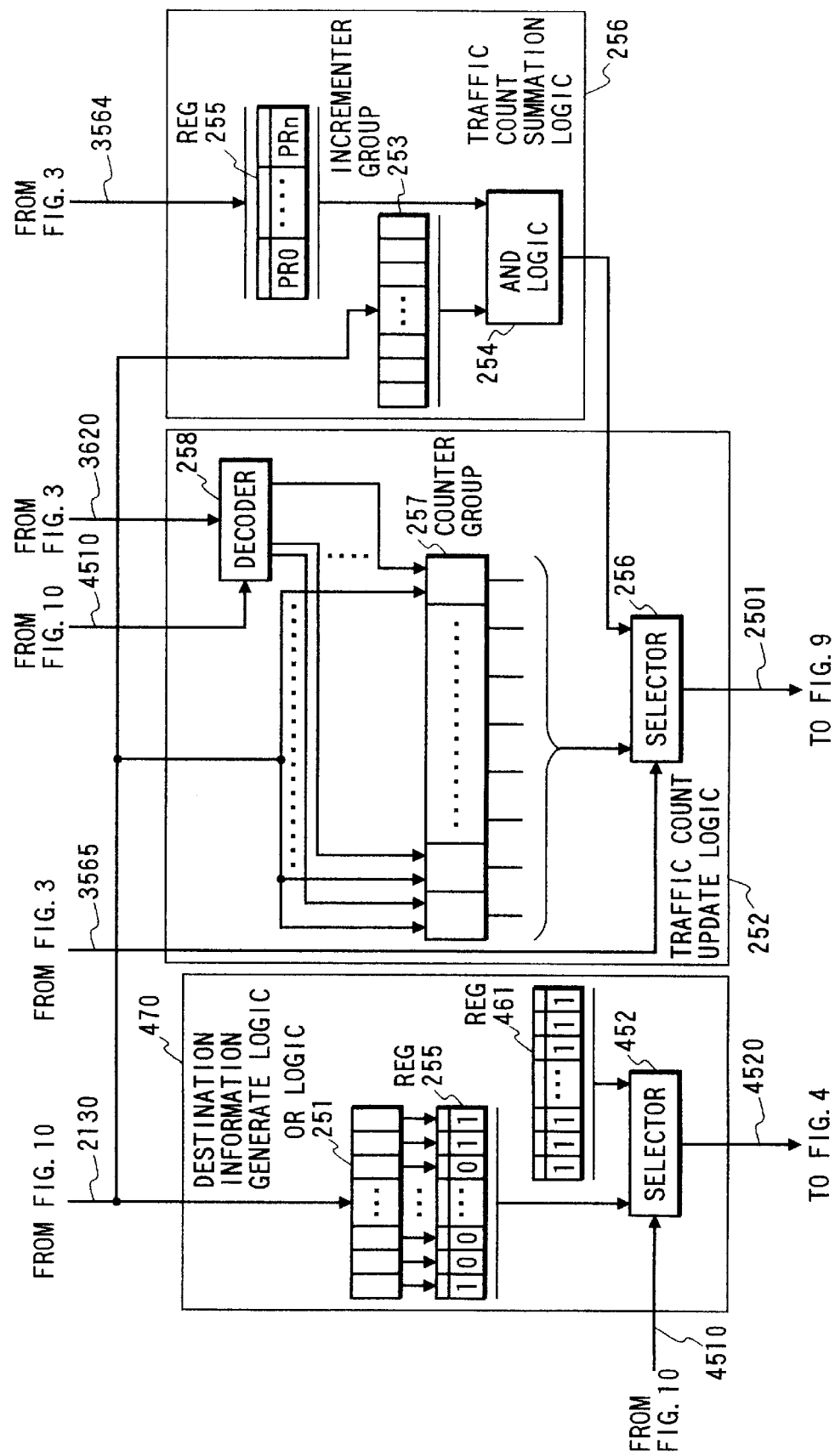
FIG. 11 is a schematic block diagram of a traffic count control unit used in the apparatus of FIG. 9.

In FIG. 11, the OR logic 251 in the destination information generate logic 470 in the traffic count control unit 250 is one to judge whether the traffic count in each field of the read traffic count map is 0 or not. It comprises plural (n) OR gates of equal in number to the number (n) of those fields, and each OR gate ORs all bits of the traffic count included in the corresponding field. Thus, the OR logic 251 generates a bitmap equivalent to the processor unit caching bitmap P-BITMAP in the embodiment 1, and stores it in the register 255. The selector 452 responds to the hit signal 4510 of TLB 200 and selects the bitmap in the register 255. On the other hand, when TLB 210 mishits, the selector 452 selects the bitmap which is held in the register 461 beforehand and whose all fields are "1", so as to broadcast to all processor units, as in the embodiment 1. The bitmap selected with the selector 452 is sent to the cache control unit 350 by way of line 4520. The cache control unit 350 generates the destination bitmap D-BITMAP by using the bitmap thus generated as in the embodiment 1, and sends a coherent processing request containing it, to be more concrete, a coherent read request, to the interconnection network 50. However, the virtual address VA which CPU core 100 sent is added to the coherent processing request, unlike the embodiment 1.

(3) Snoop Processing

The operation of the processor unit 10-j which receives the coherent processing request is different from the embodiment 1 in the following points. That is, hit-check is executed as to whether the address translation data concerning the memory area designated by the coherent processing request, to be more concrete, the page and the traffic count map are registered in TLB 200. The receive control logic 356 (FIG. 3) in the cache control unit 350 in the present embodiment is constructed so as to cut out the virtual address VA in received the coherent processing request, to send it TLB 210 by way of line 3567 (FIG. 9) and to search TLB 210 by using the virtual address VA.

In FIG. 10, the selector 216 in TLB 210 selects the virtual address VA on line 3567 according to the message receive notice signal 3565 given from the receive control logic 356 (FIG. 3), and searches TLB association portion 211 according to this virtual address. The hit detect logic 214 hit-checks TLB 200 by the result of this search and sends the result of the hitcheck to the cache control unit 350 by way of line 4510 (FIG. 10). The cache control unit 350 generates the cache line status notice containing the bit PR indicative of this hit check result by the method similar to one in the embodiment 1, sends it to the request source processor unit 10-i by way of the interconnection network 50.

In addition, the processor unit 10-j which receives the coherent read request renews the traffic count portion 213 in TLB 210. That is, in the traffic count update logic 252 in the traffic count control unit 250, each bit of the traffic count map COMMCOUNTMAP sent from the traffic count portion 213 on line 2130 is set to the counter group 257 that comprises plural (n) counters. When the hit signal 4510 of TLB 210 shows hit, the decoder 258 supplies a count up signal to the counter corresponding to the identifier SID of the request source processor unit 10-i notified by line 3620. The traffic count held in the counter is counted up by one. Thus, the traffic count map read from TLB 200 is renewed. The selector 256 selects this counter group 257, and stores it in the traffic count portion 213 of TLB 210 by way of line 2501. The selector 256 is controlled by the message receive notice signal 3565 from the receive control logic 356.

(4) Accumulation of the Status Notices

The accumulation in the request source processor unit of the status notices is different from the embodiment 1 in the following points. When the request source processor unit receives the cache line status notices from all of other processor units to which the coherent processing request was sent, the receive control logic 356 (FIG. 3) in the cache control unit 350 cuts out the hit result bit PR in the received cache line status notice and the identifier RID of the source processor unit to line 3564, as in the embodiment 1. In the present embodiment, the register 255 in the traffic count summation logic 259 has a field for each processor unit, and stores the received bit PR in the field designated by the received identifier RID. Thus, the hit check result of the notices from all of other processor units to which the coherent processing request was sent is reflected in the register 255.

The incrementer group 253 comprises plural incrementers of 4 bit widths, corresponding to all the processor units. Each incrementer increments the value of the field assigned to a corresponding processor unit within the traffic count map read from TLB 200. The AND logic 254 comprises plural AND gates corresponding to all the processor units. Each AND gate ANDs the traffic count after incremented corresponding to a processor unit to which the AND gate corresponds and the hit check result bit PR corresponding to the processor unit in the register 255. The selector 256 selects the new the traffic count map generated by the AND logic 254, and stores it in the traffic count portion 213 of TLB 200 by way of line 2501. By renewing the traffic count map like this, the traffic count in TLB 200 to a processor unit of the PR bit "0" becomes "0", and this processor unit is excluded from multicast targets of a coherent processing request afterwards. On the other hand, the traffic count in TLB 200 to a processor unit of the PR bit "1" is incremented by one.

(5) Cache Line Store Operation/Cache Line Replacement

Unlike the embodiment 1, no operation to the traffic count provided in TLB 210 is necessary, in correspondence to the cache line store operation for storing a new cache line or in correspondence to the cache line replacement operation. This is because a TLB entry is not purged even when the cache memory 300 has no cache line of an address belonging to a memory area corresponding to that entry, unlike purging of an entry of the multicast table 400 in the embodiment 1 at absence of a cache line corresponding to that entry.

(6) TLB Entry Replace/Process Swapping

The main memory 70 has the page table entry 7000 and the process control block 710. These are defined by the usual OS but the traffic information and the process traffic information characteristic to the present invention are provided as the internal fields of them. When the entry in TLB 210 is replaced, a cache line which belongs to the page controlled by that TLB entry is flushed, as in the embodiment 1. The traffic count portion 213 in the TLB entry in the page table entry 7000 (FIG. 9) is stored in the main memory module 70-1 for the process control to be described later on.

Figure 12:
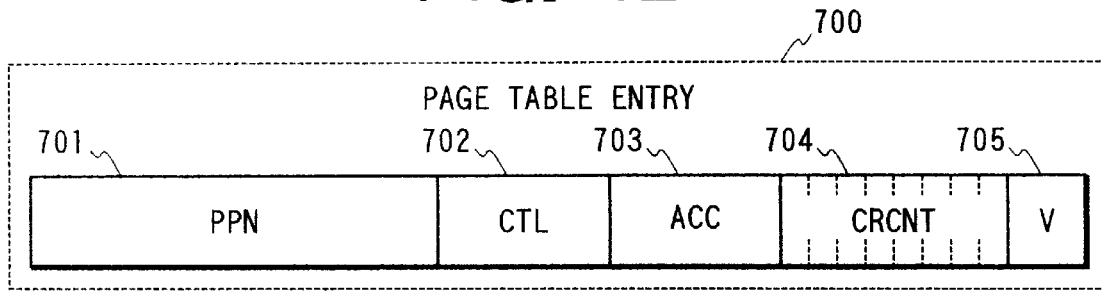
FIG. 12 is a format of a page table entry used in the apparatus of FIG. 9.

FIG. 12 shows the format of the page table entry 7000. PPN 701 shows a physical page number, CTL 702 shows presence or absence of the change in a corresponding page and various pieces of control information on allowance of caching or not, and so on, ACC 703 shows the access right, and V 705 shows a valid bit. CRCNT 704 is the traffic count portion 213 stored in TLB 210 or the reduced version thereof. When the traffic count portion 213 is reduced, it is possible to delete from the upper bits. The method of storing in the page table entry of the traffic count portion 213 in the TLB 210 entry can be either one by special hardware or one by software using the memory direct write. In the present embodiment, the latter will be explained.

The memory direct write is to directly execute a write access to the main memory without using the cache, depending upon the range of the memory address or the attribute of the page to which the address belongs. First, the traffic count portion 213 in the TLB 210 entry is mapped to an address in an I/O space, CPU core 100 executes read to that address, and stores the content of the traffic count portion 213 in the register in CPU core 100. CPU core 100 stores the content of this register in the address corresponding to the CRCNT704 field of the corresponding table entry 7000. The memory direct write request from CPU core 100 and the data are sent to the send control logic 353 by way of line 1003. The send control logic 353 sends the received data and the memory direct write request to the main memory module 70-k by way of the interconnection network 50. The main memory module 70-k writes the data in the address designated by this request.

It is preferable to assign a process having been executed in the processor unit 10-i when the process is to be swapped in again after being swapped out, so that cache miss will occur as less frequently as possible or so that the traffic of the coherent read requests will not increase even if cache miss occurs. Usually, so-called affinity control which assigns the swapped out process to the original processor unit again is adopted for the former object.

In the present embodiment, traffic of the coherent read requests is accumulated in unit of a process and is stored in the process control block 710, as an interface to execute process assignment, based upon the traffic of the coherent read requests. For this, CRCNT 704 in each page table entry 7000 is accumulated for each field thereof, and the result of the accumulation is stored in the process traffic information field 718 provided in the process control block 710.

Figure 13:
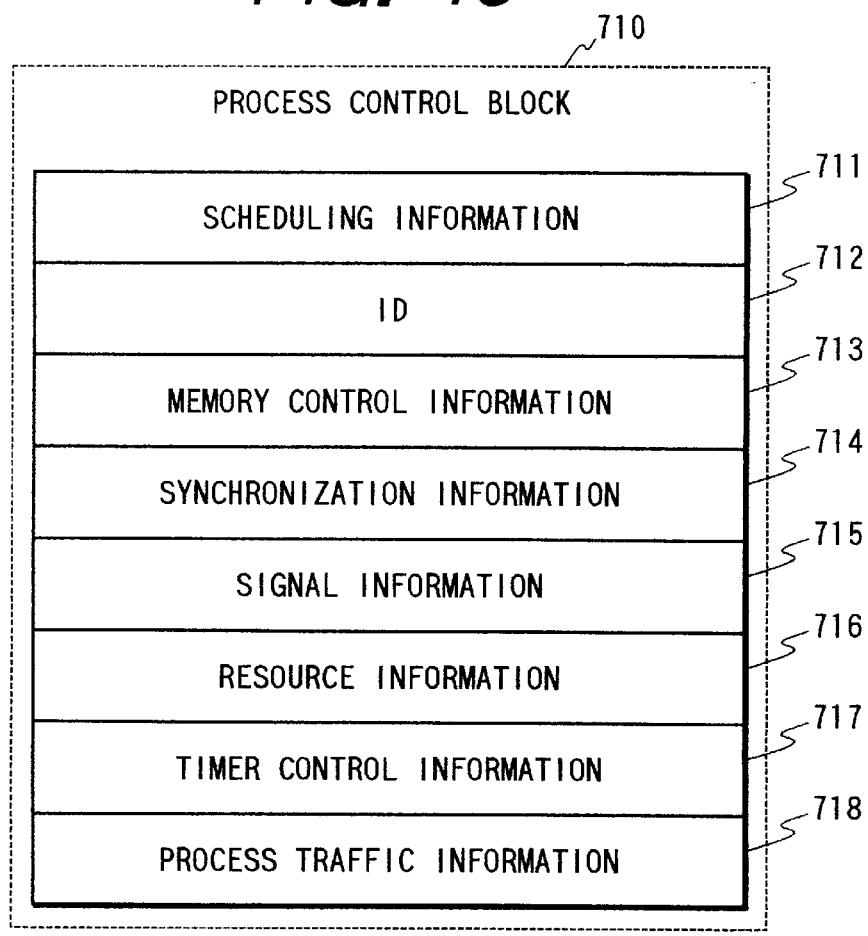
FIG. 13 is a format of a process control block used in the apparatus of FIG. 9.

FIG. 13 shows the format of the process control block 710. The process control block 710 generally contains the scheduling information 711, various identifiers 712, the memory control information 713, the synchronous information 714, the signal information 715, the resource usage information 716, and the timer control information 717, but it further contains the process traffic information 718 in the present embodiment. The page table entry 7000 is searched by the range of the address shown by the memory control information 713 in the process control block 710, and CRCNT 704 stored in this entry is accumulated for each field thereof and the accumulation result is stored in the process traffic information portion 718. The above-mentioned operation is executed by the OS.

When the process shown by the process control block 710 is assigned to one of the processor units again, the OS determines a processor unit which should be assigned, by using this process traffic information 718. This assignment is executed as follows.

In general, in the interconnection network, the transfer time of a message in the network (called as a communication distance) is different, depending upon the combination of the port of the source of the message and the port of the destination. For that case, at assignment of a message of a processor unit, processes that have many shared data are assigned to combination of processor units which have shorter communication distance. The interconnection network 50 used in the present embodiment is a single crossbar switch. The communication distance of the network is the same for this crossbar switch between any combination of ports. Therefore, such special assignment based upon the communication distance needs not be executed. However, when the number of processor units increases, the structure of the switch becomes complex in a single crossbar switch. It is known that it is preferable to use a hypercrossbar switch is composed of combination of plural crossbar switches in place of such a single crossbar switch, from the point of the reduction of the logic scale. When this hypercrossbar switch is used as the interconnection network 50, the communication distances between processor units are different depending on the combination of ports to which they are connected. Therefore, the assignment of the process in the present embodiment is effective for this case.

In case the application such as an online transaction is processed, plural processes are generated for plural functions when the system is invoked and continues to exist until the system stops. The data which the application accesses is different for each function. The processes with different functions hardly have shared data. Therefore, by controlling the processes based on the traffic as disclosed in the present embodiment, decentralization of functions is executed automatically at swap in/swap out of the processes so that processes which have many shared data are assigned to processor units among which the communication distances are short. Therefore, share of the data is localized, so the range of multicast of the coherent read request becomes narrow and the busy rate of the interconnection network 50 is reduced.

According to the present invention, it is possible to prevent transfer of coherent read requests to processor units which are clearly not involved in cache maintenance of coherency. As a result, the busy rate of the interconnection network is suppressed and the cache line transfer latency can be reduced.

What is claimed is:

1. A multiprocessor system comprising:
    a plurality of processor units each including at least one processor;
    at least one memory unit shared by said plurality of processor units;
    a cache memory provided in correspondence to each processor unit;
    a logic provided in correspondence to each processor unit and responsive to a memory access request therefrom for generating a first cache coherent processing request related to a first memory address designated by said memory access request;
    a caching status memory provided in correspondence to each processor unit for storing a processor unit caching status for discriminating whether each of said plurality of processor units holds data belonging to each of a plurality of memory areas belonging to said memory unit;
    a destination information generation logic provided in correspondence to each processor unit for generating destination information designating part of said plurality of processor units which hold at least one data belonging to a first memory area to which said first memory address belongs; and
    an interconnection network for connecting said plurality of processor units and said memory unit, said interconnection network comprising a parallel transfer network for transferring said first cache coherent processing request to said part of said plurality of processor units in response to said destination information.

2. A multiprocessor system according to claim 1, wherein each processor unit further comprises:
    an update logic for said caching status memory;
    a response logic responsive to a second cache coherent processing request transferred from another processor unit by way of said interconnection network for sending to said interconnection network, a portion addressed to said another processor unit, which is related to a second memory area including a second address designated by said second cache coherent processing request and to said each processor unit, within said stored processor unit caching status;
    wherein said update logic for said caching status memory updates a portion related to said each processor unit within said stored processor unit caching status, in response to change of memory areas to which a plurality of valid data held in said cache memory belong;
    wherein said update logic for said caching status memory further updates portions related to said first memory area and each related to one of said part of said plurality of processor units, within said stored processor unit caching status, in response to portions each of which has been transferred in response to said first cache coherence processing request from one of said part of said plurality of processor units by way of said interconnection network, and each of which is related to said first memory area and one of said part of said plurality of processor units.

3. A multiprocessor system according to claim 1, further comprising:
    a logic for generating, as said destination information, destination information designating said plurality of processor units, when said processor unit caching status stored in said caching status memory does not include a portion related to said first memory area to which said first memory address belongs.

4. A multiprocessor system according to claim 1,
    wherein said caching status memory includes a plurality of entries;
    wherein each entry is provided in correspondence to one of a plurality of memory areas;

wherein each entry has a plurality of fields respectively corresponding to said plurality of said processor units;

wherein each field has information discriminating whether a processor unit corresponding to said each field caches data belonging to a memory area corresponding to said each entry.

5. A multiprocessor system according to claim 4, wherein said information included in each field of each entry of said caching status memory includes information of one bit indicative of whether a processor unit corresponding to said each field caches data belonging to a memory area corresponding to said each entry, thereby each entry has a bitmap indicative of whether said plurality of processor units cache data belonging to a memory area corresponding to said entry.

6. A multiprocessor system according to claim 5, wherein said destination information generation logic comprises a logic which supplies said bitmap stored in an entry corresponding to said first memory area to which said first memory address belongs, as said destination information.

7. A multiprocessor system according to claim 2, wherein said caching status memory includes a plurality of entries;

wherein each entry is provided in correspondence to one of a plurality of memory areas;

wherein each entry has a plurality of traffic count fields respectively corresponding to said plurality of said processor units;

wherein said update logic includes a logic for controlling whether a traffic account in a field corresponding to each of said part of said plurality of processor units, within an entry corresponding to said first memory area, within said plurality of entries within said caching status memory, depending upon portions each of which has been transferred in response to said first cache coherence processing request from one of said part of said plurality of processor units by way of said interconnection network, and each of which is related to said first memory area and one of said part of said plurality of processor units.

8. A multiprocessor system according to claim 7, wherein said caching status memory is provided in a translation look aside buffer for translating a virtual address designated by said processor within said each processor unit into a real address.

9. A multiprocessor system according to claim 1, wherein said parallel transfer network comprises:

a logic for judging whether a plurality of pieces of destination information attached to a plurality of cache coherent processing requests generated by plural processor units designate a same processor unit; and a logic for starting transfer of said plurality of cache coherent processing requests at a same timing in parallel, when said plurality of pieces of destination information does not designate a same processor unit.

10. A multiprocessor system according to claim 9, wherein said parallel transfer network comprises a crossbar switch.

11. A multiprocessor system, comprising:

a plurality of processor units each including at least one processor;

at least one memory unit shared by said plurality of processor units;

an interconnection network for connecting said plurality of processor units and said memory unit;

wherein each processor unit comprises:

a cache memory for holding a copy of a plurality of pieces of data held in said memory unit and cache statuses of respective pieces of data, a caching status memory for storing a processor unit caching status for discriminating whether each of said plurality of processor units holds data belonging to each of a plurality of memory areas belonging to said memory unit, a request send logic connected to said processor, said caching status memory and said interconnection network and responsive to a memory access request which is issued from said processor and requests first data of a first memory address, for sending a first cache coherent processing request related to said first memory address, by way of said interconnection network, to part of said plurality of processor units as discriminated by said stored processor unit caching status to a first memory area to which said first memory address belongs;

a response send logic connected to said cache memory, said caching status memory and said interconnection network and responsive to a second cache coherent processing request related to a second memory address and transferred from another of said plurality of processor units by way of said interconnection network, for sending said another processor unit by way of said interconnection network, a cache status in said cache memory, of second data of said second memory address and a portion of said stored processor unit caching status, related to caching in said each processor unit, of data belonging to a second memory area to which said second memory address belongs, and an update logic connected to said cache memory and said interconnection network for updating said caching status memory, in response to change of memory areas to which a plurality of pieces of valid data held in said cache memory belong and in response to portions of processor unit caching statuses as included in a plurality of responses transferred in response to said first cache coherent processing request from said part of said plurality of processor units by way of said interconnection network.

12. A multiprocessor system according to claim 11, wherein said caching status memory stores said processor unit caching status in correspondence to one of a plurality of memory areas and a number of pieces of valid data belonging to said one memory area, as stored in said cache memory;

wherein said update logic comprises:

a logic for updating numbers of pieces of valid data stored in said caching status memory in response to change of a number of pieces of valid data belonging to each of said plurality of memory areas, as stored in said cache memory;

a logic for invalidating said processor unit caching status corresponding to one of said plurality of memory areas, as stored in said caching status memory, when said number of pieces of valid data corresponding to said one memory area, as stored in said caching status memory has become 0.

13. A multiprocessor system according to claim 12, further comprising:

a logic responsive to storing of another data belonging to another of said plurality of memory areas in said cache memory, for replacing both said invalidated processor unit caching status corresponding to said one memory area and said number of pieces of valid data corresponding to said one memory areas both stored in said caching status memory, by a processor caching status corresponding to said another memory area and a number of pieces of valid data corresponding to said another memory area.

14. A multiprocessor system according to claim 11, wherein said request send logic comprises:

a destination information generation logic responsive to said memory access request from said processor for generating destination information designating part of said plurality of processor units which hold at least one data belonging to said first memory area to which said first memory address designated by said memory access request belongs, said generating being executed, based upon said processor caching status stored in corresponding to said first memory area; and a send logic for sending said interconnection network said first coherent processing request and said generated destination information;

wherein said interconnection network comprises a parallel transfer network for transferring said first cache coherent processing request to said part of said plurality of processor units in parallel, in response to said destination information.

15. A multiprocessor system according to claim 14, wherein said caching status memory includes a plurality of entries;

wherein each entry is provided in correspondence to one of a plurality of memory areas;

wherein each entry has a plurality of fields respectively corresponding to said plurality of said processor units;

wherein each field has information discriminating whether a processor unit corresponding to said each field caches data belonging to a memory area corresponding to said each entry.

16. A multiprocessor system according to claim 15, wherein said information included in each field of each entry of said caching status memory includes information of one bit indicative of whether a processor unit corresponding to said each field caches data belonging to a memory area corresponding to said each entry, thereby each entry has a bitmap indicative of whether said plurality of processor units cache data belonging to a memory area corresponding to said entry.

17. A multiprocessor system according to claim 14, wherein said destination information generation logic comprises a logic which supplies said bitmap stored in an entry corresponding to said first memory area to which said first memory address belongs, as said destination information.

18. A multiprocessor system according to claim 14, wherein said parallel transfer network includes:

a logic for judging whether a plurality of pieces of destination information attached to a plurality of cache coherent processing requests generated by plural processor units designate a same processor unit; and a logic for starting transfer of said plurality of cache coherent processing requests at a same timing in parallel, when said plurality of pieces of destination information does not designate a same processor unit.

19. A multiprocessor system according to claim 18, wherein said parallel transfer network comprises:

a crossbar switch.

20. A multiprocessor system according to claim 11, wherein said part of said plurality of processor units are ones discriminated by said stored processor unit caching status as ones which cache at least one data belonging to said first memory area.

21. A multiprocessor system according to claim 11, wherein said update logic comprises:

an update logic for updating a portion related to said each processor unit within said stored processor unit caching status, in response to said change of memory areas to which a plurality of valid data held in said cache memory belong, and for updating portions within said stored processor unit caching status, each related to caching in one of said part of said plurality of processor units, of data belonging to said first memory area, in response to said portions of said processor unit caching statuses as included in said plurality of responses.

22. A multiprocessor system according to claim 11, further comprising:

a cache status control logic for controlling a cache status of each of plurality pieces of data held in said cache memory;

wherein said cache status control logic responds to said cache status related to data of said first memory address included in each of said plurality of responses and determines a cache status of said first data in said each processor unit.

23. A multiprocessor system according to claim 11, wherein each of said plurality of memory areas caching statuses of which said caching status memory discriminates is one which can store at least one data which can be stored in said cache memory.

24. A multiprocessor system according to claim 11, wherein each of said plurality of memory areas caching statuses of which said caching status memory discriminates is one which can store plural pieces of data each of which can be stored in said cache memory.

25. A multiprocessor system according to claim 11, wherein said caching status memory includes a plurality of entries;

wherein each entry is provided in correspondence to one of a plurality of memory areas;

wherein each entry has a plurality of traffic count fields respectively corresponding to said plurality of said processor units;

wherein said update logic includes a logic for controlling whether a traffic account in a field corresponding to each of said part of said plurality of processor units, within an entry corresponding to said first memory area, within said plurality of entries within said caching status memory, depending upon portions each of which has been transferred in response to said first cache coherence processing request from one of said part of said plurality of processor units by way of said interconnection network, and each of which is related to said first memory area and one of said part of said plurality of processor units.

26. A multiprocessor system according to claim 11, wherein said caching status memory is provided in a translation look aside buffer for translating a virtual address designated by said processor within said each processor unit into a real address.

* * * * *